(12) United States Patent
Rodgers et al.

(10) Patent No.: US 10,088,979 B2
(45) Date of Patent: Oct. 2, 2018

(54) RECASTING A FORM-BASED USER INTERFACE INTO A MOBILE DEVICE USER INTERFACE USING COMMON DATA

(71) Applicant: ORACLE INTERNATIONAL CORPORATION, Redwood Shores, CA (US)

(72) Inventors: Michael Patrick Rodgers, Orange, CA (US); Filipe Leahy-Dios, Bracknell (GB); Gurbinder Singh Bali, Highlands Ranch, CO (US); Shoaib Javed Lal Mohammed Ameerjan, Tamil Nadu (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 489 days.

(21) Appl. No.: 14/831,633

(22) Filed: Aug. 20, 2015

(65) Prior Publication Data

US 2016/0092036 A1 Mar. 31, 2016

Related U.S. Application Data

(60) Provisional application No. 62/055,828, filed on Sep. 26, 2014.

(51) Int. Cl.
*G06F 17/00* (2006.01)
*G06F 3/0482* (2013.01)
(Continued)

(52) U.S. Cl.
CPC ......... *G06F 3/0482* (2013.01); *G06F 17/211* (2013.01); *G06F 17/30076* (2013.01);
(Continued)

(58) Field of Classification Search
CPC .................... G06F 17/211; G06F 17/30869
See application file for complete search history.

(56) References Cited

U.S. PATENT DOCUMENTS 5,299,305 A * 3/1994 Oomae ................. G06F 17/243
715/200
6,332,163 B1 * 12/2001 Bowman-Amuah .......................
H04L 12/4604
709/217
(Continued)

*Primary Examiner* — Laurie Anne Ries
(74) *Attorney, Agent, or Firm* — Vista IP Law Group, LLP

(57) ABSTRACT

A method, system, and computer program product for mobile device interface generation. Embodiments commence upon receiving electronic communication comprising form metadata describing a user interface form. The form metadata comprises one or more field identifiers, which fields of the user interface form are bound to JSON messages (e.g., to receive field data). The form metadata further describes data types pertaining to the form fields, and the data types pertaining to the fields are used to select one or more user interface screen devices from a repository. One or more of the user interface screen devices are associated (e.g., bound) to occurrences of the same JSON message as were bound to fields of the user interface form. The selected one or more interface screen devices are output in a format of data that describes the selected interface screen devices in a manner for deployment on corresponding a mobile device or devices.

27 Claims, 20 Drawing Sheets

(51) Int. Cl.
 *G06F 17/21* (2006.01)
 *G06F 17/30* (2006.01)
 *H04M 1/725* (2006.01)

(52) U.S. Cl.
 CPC .. *G06F 17/30091* (2013.01); *G06F 17/30569* (2013.01); *H04M 1/72561* (2013.01)

(56) References Cited

U.S. PATENT DOCUMENTS

| | | | |
|---|---|---|---|
| 8,132,149 B2* | 3/2012 | Shenfield | G06F 8/20 |
| | | | 715/763 |
| 9,286,637 B1* | 3/2016 | Keld | G06Q 40/06 |
| 9,367,530 B2* | 6/2016 | Antebi | G06F 17/30206 |
| 9,811,280 B2* | 11/2017 | Kumar K. M. | G06F 3/0631 |
| 2006/0088806 A1* | 4/2006 | Quinn | G06Q 50/2057 |
| | | | 434/236 |
| 2006/0248506 A1* | 11/2006 | Luo | G06F 8/38 |
| | | | 717/104 |
| 2007/0146339 A1* | 6/2007 | Yang | G06F 3/0414 |
| | | | 345/173 |
| 2011/0154287 A1* | 6/2011 | Mukkamala | G06F 8/20 |
| | | | 717/105 |
| 2011/0273394 A1* | 11/2011 | Young | G06F 3/047 |
| | | | 345/174 |
| 2012/0102406 A1* | 4/2012 | Demant | G06F 9/4443 |
| | | | 715/734 |
| 2013/0262626 A1* | 10/2013 | Bozek | H04L 67/10 |
| | | | 709/217 |
| 2015/0134707 A1* | 5/2015 | Doherty | G06F 3/048 |
| | | | 707/806 |
| 2016/0077675 A1* | 3/2016 | Rav-Acha | G06T 1/0007 |
| | | | 715/703 |

* cited by examiner

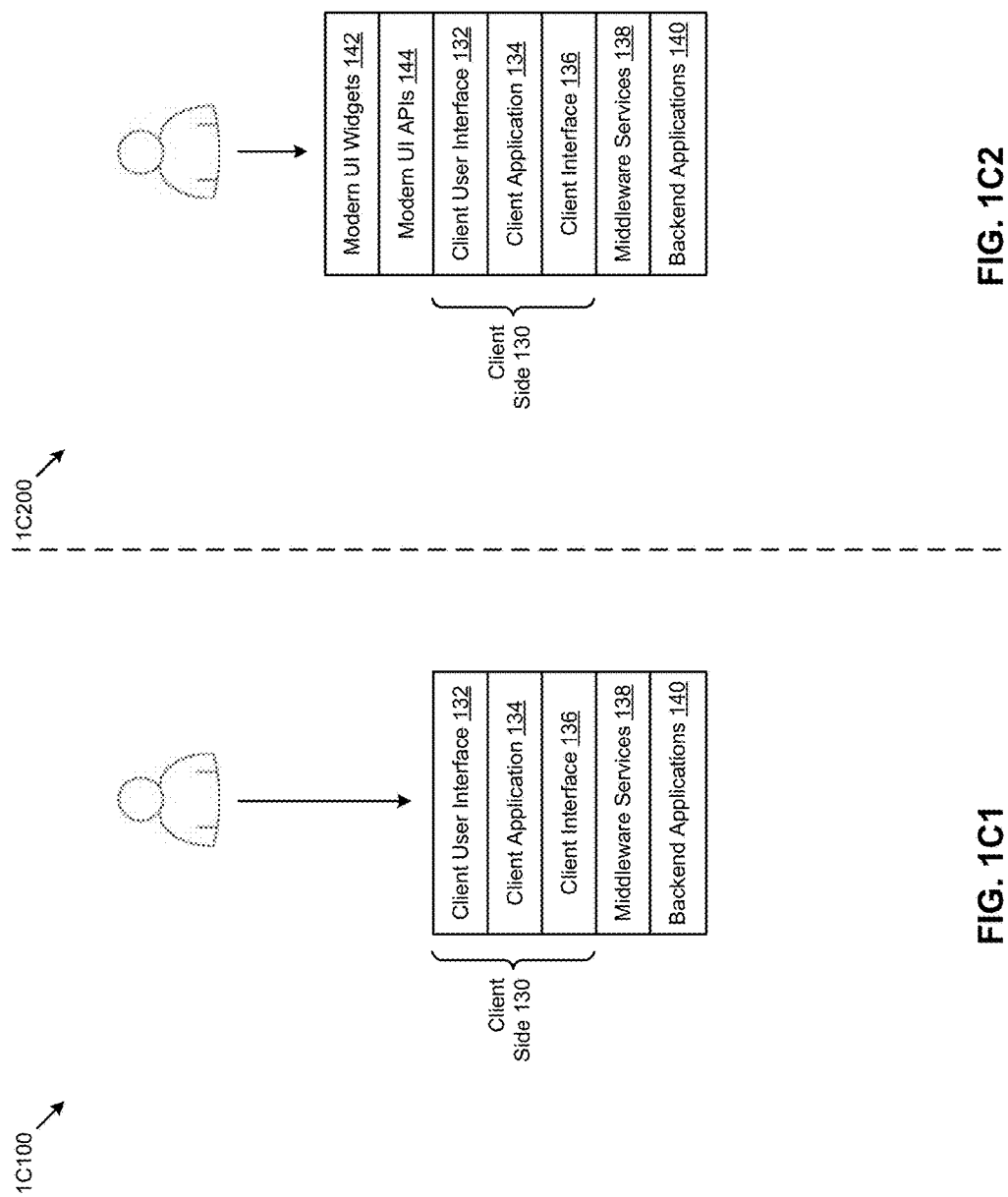

5A00

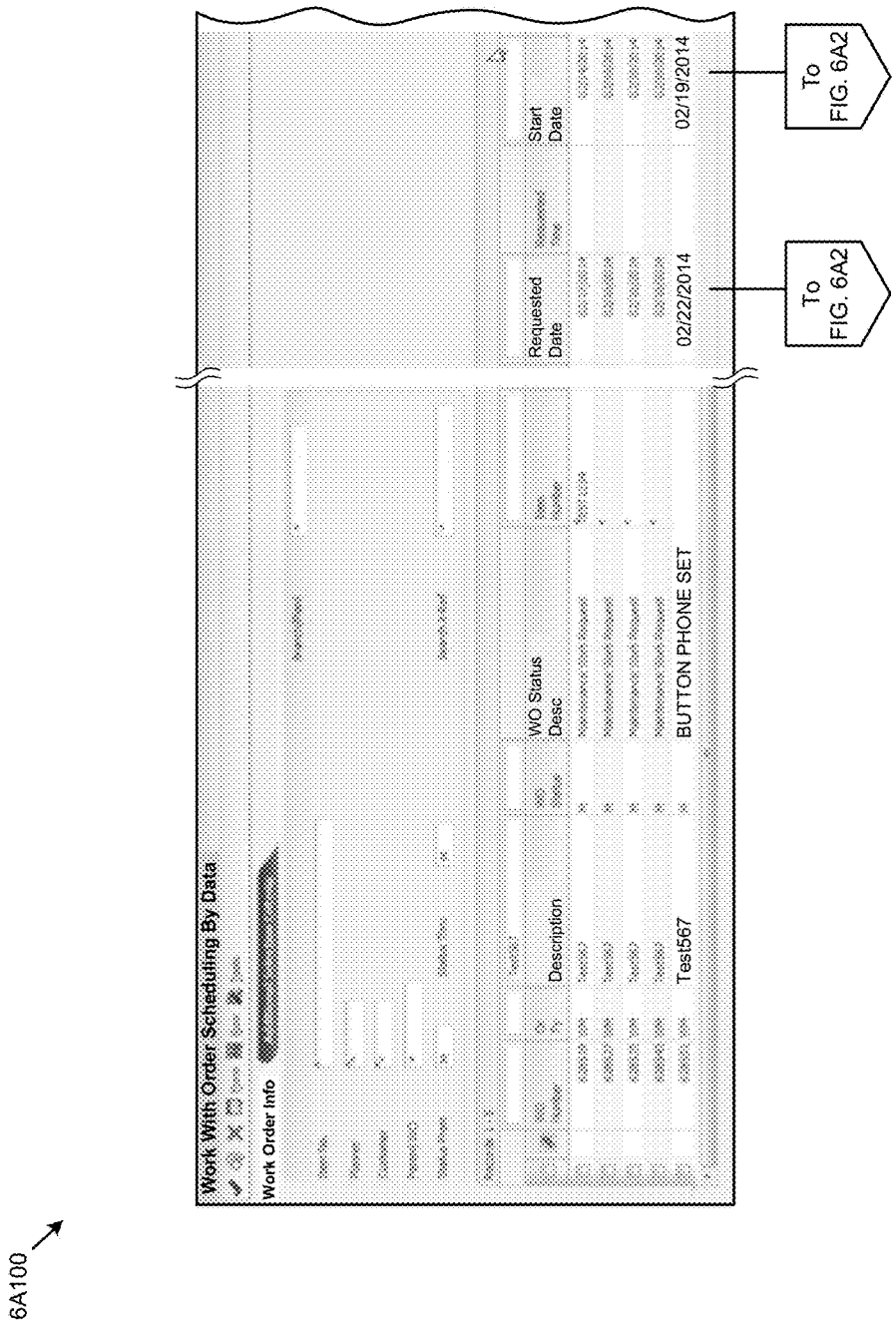
FIG. 6A1

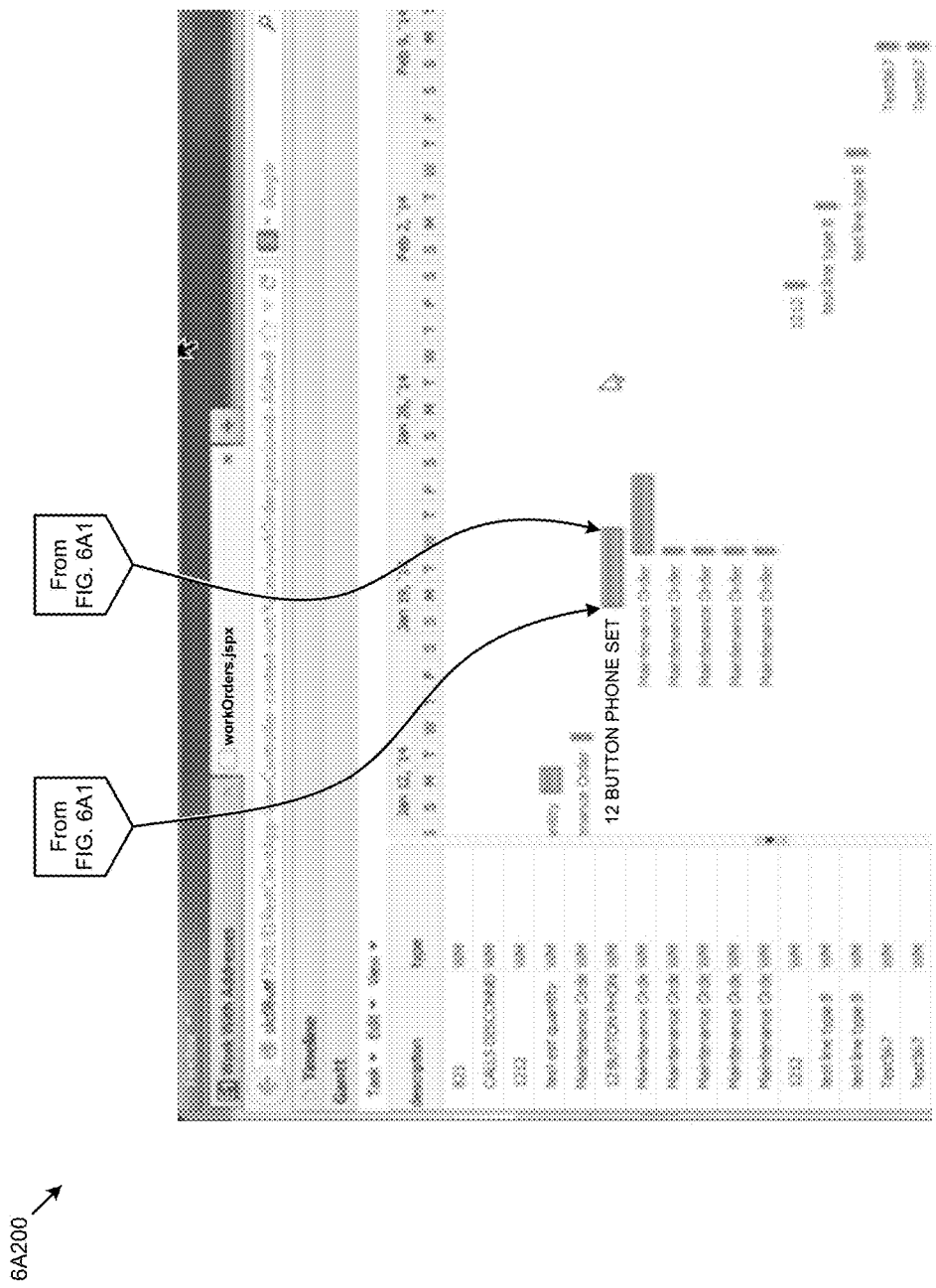
FIG. 6A2

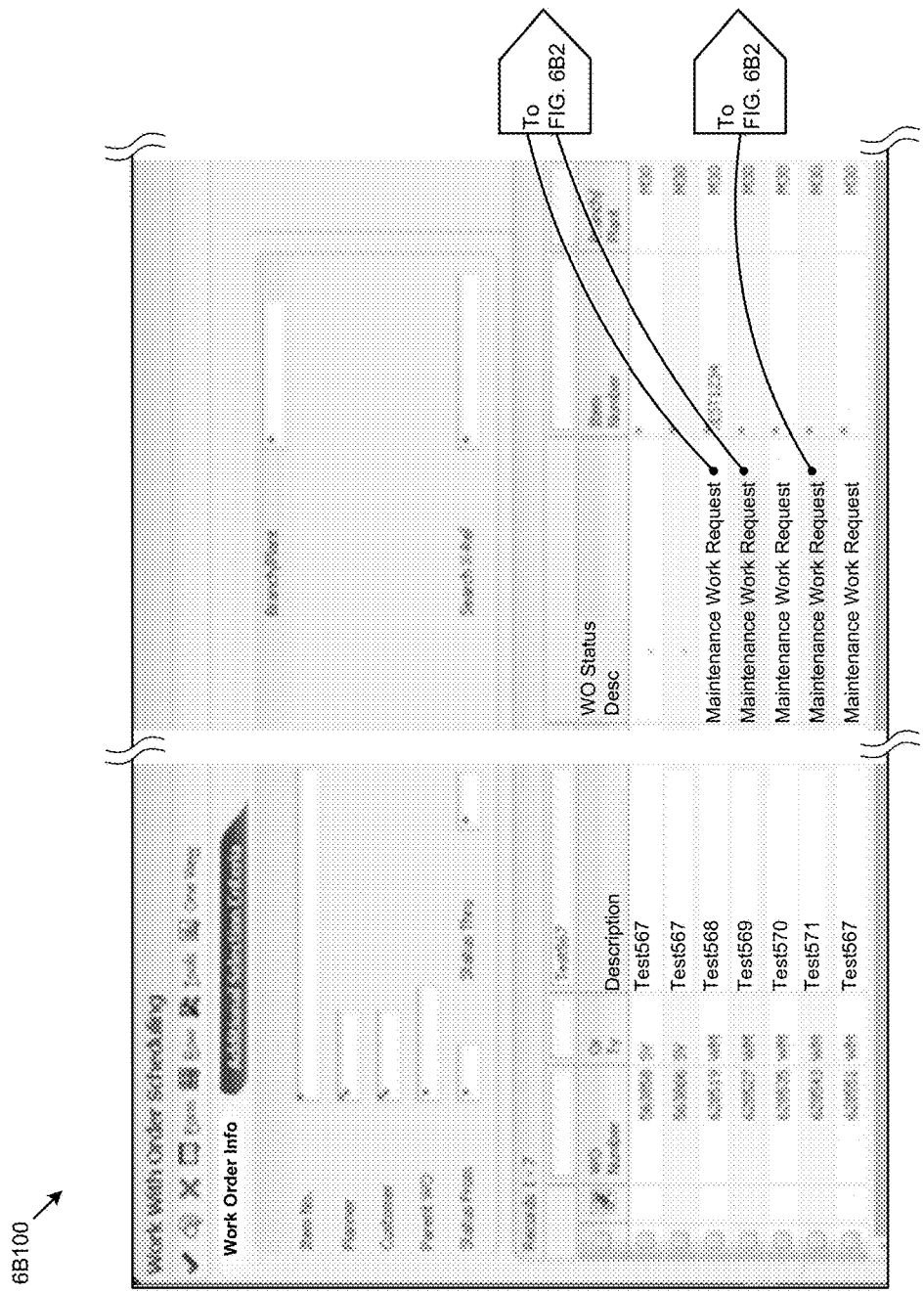
FIG. 6B1

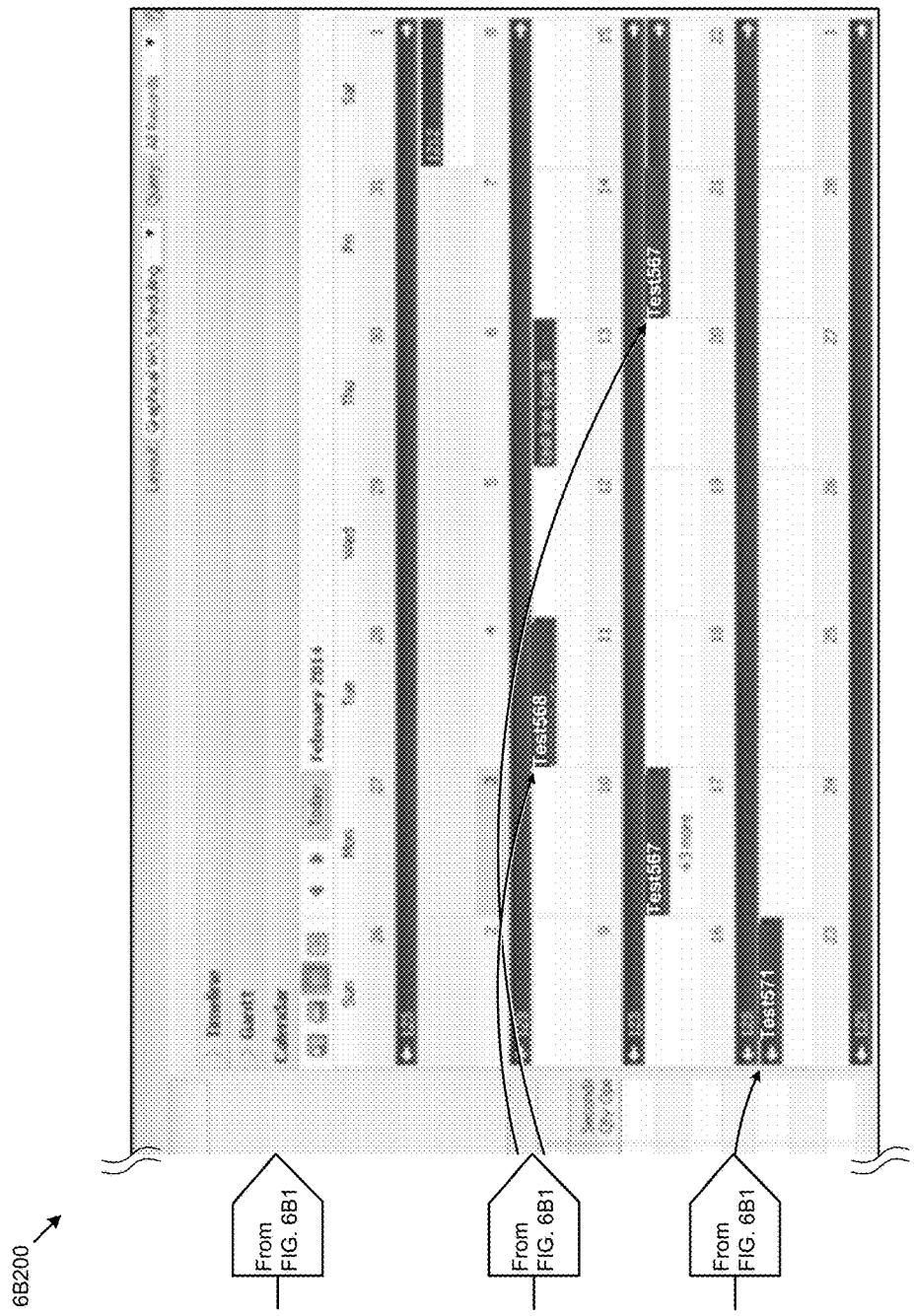
FIG. 6B2

RECASTING A FORM-BASED USER INTERFACE INTO A MOBILE DEVICE USER INTERFACE USING COMMON DATA

The present application claims the benefit of priority to U.S. Provisional Patent Application Ser. No. 62/055,828, titled "RECASTING A FORM-BASED USER INTERFACE INTO MODERN MOBILE DEVICE USER INTERFACE", filed Sep. 26, 2014, which is hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

This disclosure relates to the field of mobile device interface generation and more particularly to techniques for automatically recasting a form-based user interface into a modern user interface.

BACKGROUND

Once an enterprise application is written, changes to the logic tend to be minor, few, and far-between. Indeed, in enterprise software, transactional integrity and the accuracy of business logic are of paramount importance, however the manner of interacting with an enterprise application changes frequently due to reasons such as a new hardware or modes of interaction become available (e.g., a touch screen), and/or a new device becomes available (e.g., a smart phone), and/or usage models or scenarios emerge that were not contemplated when the original user interface (UI) was developed. As such, over time, the originally-developed user interface might become 'stale' and might not fairly represent emerging use cases, and/or might not take full advantage of newly-emerged modes or devices. Accordingly, quite often, enterprise software user interfaces begin to lag far behind the state of the art and, in particular, certain 'form-based' styles of user interfaces become outdated when new hardware or modes of interaction become available.

Indeed, tablets, hand-held mobile devices, and even wearable wristwatches are also becoming ubiquitous. These types of devices present new mediums in which the form factor, the amount of screen real-estate, the method of interaction (voice and touch vs. mouse and keyboard), and perhaps often the fundamental goals of interaction, vary significantly from those of the original desktop application.

What is needed is a way to be able to adapt an application's user interface to present new design styles and/or different display methods—yet present the same data as is needed by the users of the application. Techniques are needed to address the problem of rapid development of a mobile device interface from a pre-existing user interface. More specifically, what is needed is a technique or techniques for rapidly (e.g., automatically) recasting a form-based user interface into a modern user interface.

None of the aforementioned legacy approaches achieve the capabilities of the herein-disclosed techniques for automatically recasting a form-based user interface into a mobile device user interface using common data. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for automatically recasting a form-based user interface into a mobile device user interface using common data. The claimed embodiments address the problem of rapid development of a mobile device interface. More specifically, some claims are directed to approaches for providing a middleware service to recast form field data into modern user interface widgets, which claims advance the technical fields for addressing the problem of rapid development of a mobile device interface, as well as advancing peripheral technical fields. Some claims improve the functioning of multiple systems within the disclosed environments.

Certain embodiments commence upon receiving electronic communication comprising form metadata describing a user interface form. The form metadata comprises one or more field identifiers, which fields of the user interface form are bound to JSON messages (e.g., to receive field data). The form metadata further describes data types pertaining to the form fields, and the data types pertaining to the fields are used to select one or more user interface screen devices from a repository. One or more of the user interface screen devices are associated (e.g., bound) to occurrences of the same JSON message as were bound to fields of the user interface form. The interface screen devices are selected from the repository of user interface screen devices based on device parameters corresponding to user devices such as a tablet (e.g., a pad), or a small touch-screen reader, or a wearable device (e.g., a smart-watch).

Some embodiments commence upon receiving user interface form metadata, the form metadata comprising a description of a field of fields, and/or an operation pertaining to the field or fields, and data types of respective fields. The contents of the metadata is used when accessing specialized (e.g., non-form-based) user interface screen devices from a repository. Computer-aided operations are used to select interface screen devices from the repository of user interface screen devices based at least in part on the data type determined from the metadata. The selected interface screen device is output in a form or format of data that describes the selected interface screen device in a manner suited to deployment on a mobile device.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1C1 and FIG. 1C2 compare a grid-based user interface model with a mobile device user interface model using common data widgets, according to one embodiment.

FIG. 6A1 and FIG. 6A2 depict results of automatically recasting a form-based user interface into a mobile device user interface using common data, according to one embodiment.

FIG. 6B1 and FIG. 6B2 depict results of automatically recasting a form-based user interface into a mobile device user interface using common data, according to one embodiment.

DETAILED DESCRIPTION

Figure 1A:
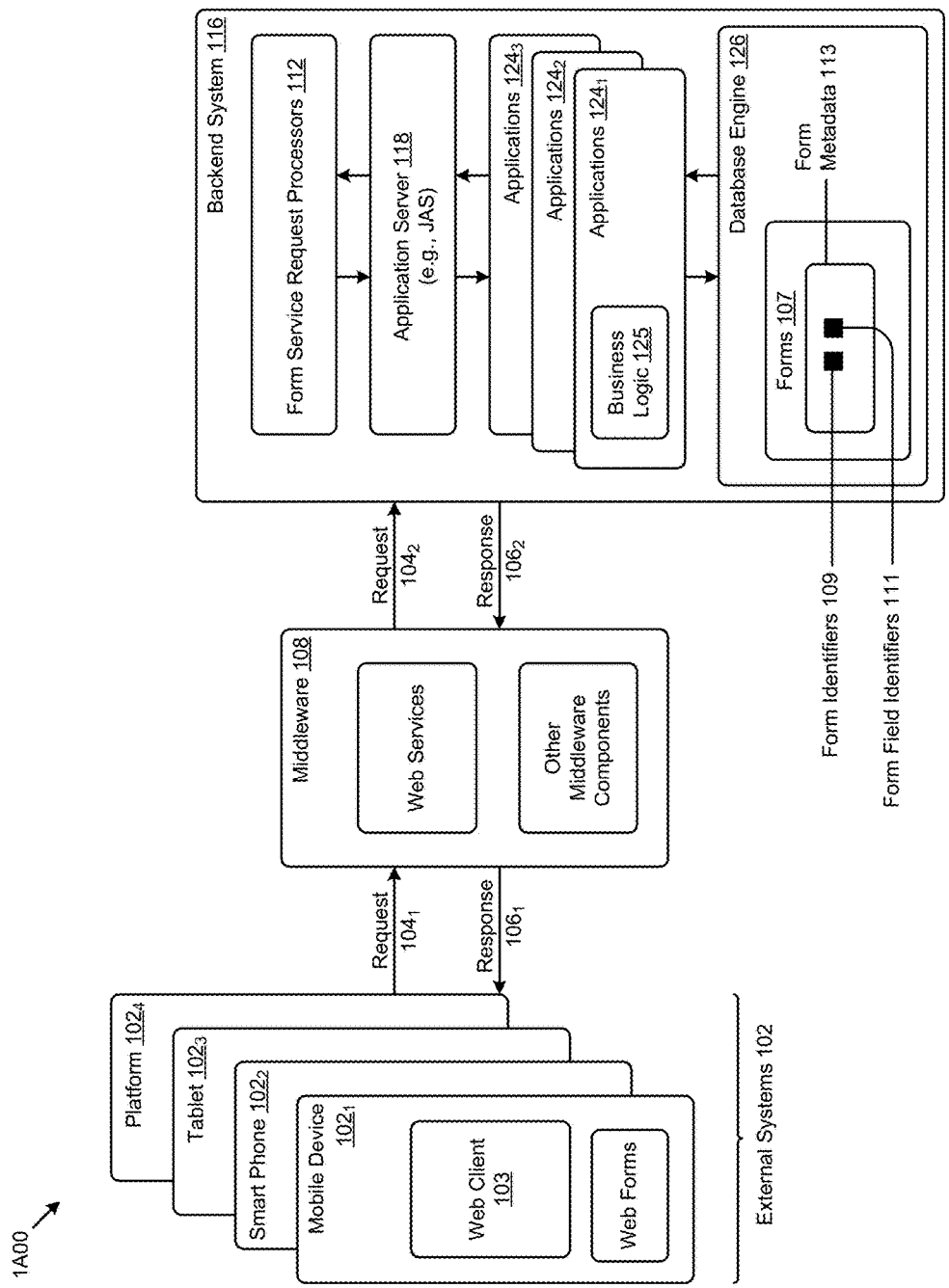
FIG. 1A exemplifies an environment in which systems for automatically recasting a form-based user interface into a mobile device user interface using common data can be deployed.

Some embodiments of the present disclosure address the problem of rapid development of a modern interface and some embodiments are directed to approaches for providing a middleware service to recast form field data into modern user interface widgets. More particularly, disclosed herein and in the accompanying figures are exemplary environments, methods, and systems for automatically recasting a form-based user interface into a mobile device user interface using common data. Some of the embodiments discussed pertain to generation of a modern application interface tailored to "core path" functionality—without rewriting or invalidating already-deployed business logic. Some cases serve to automatically generate a modern application interface tailored to "core path" functionality derived from multiple instances of already-deployed business logic (e.g., multiple enterprise software applications).

Overview

Business applications have long been available on desktops, either as an application running natively on the desktop, or as an application user interface that communicates with long-established backend logic (e.g., in a form-based client server model). As the demand increases for more and more applications being available from a non-native terminal (e.g., from mobile devices or in a computer-to-computer protocol), the cost of porting form-based user interfaces from a native desktop setting to an external system also increases.

Legacy approaches to porting have often entailed time consuming development to create or retarget (e.g., porting) significant portions of business logic in order to provide access to that logic (e.g., via services) and to enable a non-native system to perform "create", "read", "update" and "delete" (CRUD) operations specified in a grid-oriented form against the backend business logic.

The herein-disclosed approach reduces or eliminates development work associated with using a form as a specification of the needed services. The grid-oriented form, together with its metadata (e.g., enterprise- or user-supplied metadata), often satisfies the data requirements for operations to be processed in the backend business logic. The capability to use "known good" pre-existing forms (e.g., as developed for a desktop environment) from an external system would reduce or eliminate the need to port or rewrite major pieces of business logic merely to run the application from a non-native terminal.

Some embodiments facilitate the user to specify any of: user credentials, an application name, an application version, a form name, a field name, a field value, and an operation to perform (e.g., a CRUD action). Some of the embodiments of this disclosure are configured to receive the foregoing parameters and use them (e.g., via a generated service) to execute the corresponding application in a "silent mode" or in a "headless mode" (e.g., where the application is executed at a server configured to operate without a display monitor). In exemplary embodiments, the requested operation from the external system is performed by the application in a silent mode or headless mode as if a user had requested the operation from the native system.

After receiving the requested operation (e.g., via a form service request), and at some moment after the requested operation has been initiated, a "post dialog" is initiated to raise a post event. This post event is raised sometime after the operation is initiated via the respective generated service. A developer can use this event to perform post-operation logic as may be needed to meet CRUD operation requirements, even though the service request was generated from an external system, and even though the application may be running on a headless server. For example, after a requested operation is initiated and/or after a requested operation has completed at least a portion of the processing of the requested operation, the application might seek user confirmation. In the situation where the application server is attached to a display (e.g., within a desktop environment), the user might click the "OK" button to approve and/or save the transaction. In a headless environment, the aforementioned post dialog is initiated to obtain user confirmation from the external system (e.g., from a mobile device, from a smart phone, from a tablet, from a phablet, etc.). In some embodiments a post dialog is wrapped by a logic container included in the event model. Such a logic container allows a developer to specify post dialog code that executes when the application is invoked from an external system (e.g., through the form service interface). Examples of such post dialog code could include logic such as logic to provide for data filtering and/or formatting that comports to specific requirements for the external system to receive and consume results issuing from execution of the service request. Or such post dialog code could include logic to provide for data filtering and/or formatting that comports to specific requirements for a web client to receive and consume results issuing from execution of the service request. Or such post dialog code could include logic for retrieval of information or data based on the results issuing from execution of the service request and/or logic for processing the retrieved information.

Some embodiments rely in part on middleware and middleware access methods or protocols. For example, a JAS server can implement portions of a service-oriented architecture and programming (SOAP) regime and/or a representational state transfer (REST) protocol. In such embodiments, once the service has been completed, the JAS server returns data from the operation (if any) to the external system. In some cases the data is returned in a JavaScript object notation (JSON) format.

To facilitate rapid development and deployment, systems disclosed herein implement a component referred to as an application interface services server (AIS server). Such an AIS server implements a textual protocol for interacting with any enterprise applications, and allows for whatever data the application would need to render visually to be represented in a JSON format. The JSON messaging technique supports textual serialization, and allows for communication of input events such as clicks, data entry, and navigation events to be supplied in a JSON-encoded text-based format.

Systems built in accordance with the techniques of the disclosure herein-below provide for a user interface for client applications. The user interface relies, in part, on the AIS server, which in turn uses a JSON-layer to provide a new "modern" user interface while preserving all of the original business logic. This allows new user interfaces to be produced which serve to: (1) Tailor the user experience to meet the business process as it exists at a particular customer (e.g., eliminating or de-emphasizing fields and boilerplate form areas that customers do not use frequently); (2) Streamline complicated, multi-form processes to a simpler interaction paradigm (e.g., by creating a single composite form that wraps multiple forms); and (3) Customize the visual experience to match a company's look and feel or to more seamlessly integrate with other systems.

In this manner, the business process, especially the human-oriented portions of the business process, is re-invented without sacrificing or endangering the mature, highly valuable and thoroughly validated business logic. The new user interface and new business process is then built in an optimal way to fit the actual steps used in industry, and to fit the capabilities and desired use-case of the hardware at the point of use.

The ability to build lightweight "wrapper applications" is especially valuable because it aligns with the priorities of UI simplification and modernization. The modern design emphasis is to think in terms of "mobile first" or "core path first". Application interface design should be designed for progressing through the "important" things well, and then advanced functionality should be made available in a way that does not make progressing through the core path cumbersome. Form-field-oriented application user interfaces were often born of functionality first. Unfortunately rebuilding the apps from scratch is time-consuming if not prohibitively expensive. However, application wrappers that provide the ability to rebuild the user experience can serve to make the process of modernizing user interfaces scalable. Specifically (for example) a wrapper around the existing legacy application can operate by emulating the steps taken by a user during interaction with a basic HTML user interface. Wrappers in accordance with the disclosure herein present these steps as transaction data—the business logic is purposely hidden. Depending on where the wrapper is deployed, modern UIs can be developed using Java classes or JavaScript objects. JavaScript objects can be used with client-side frameworks such as Google's Polymer, jQuery, AngularJS, and others. These enable a wide variety of very different looking interfaces with a combination of interactivity and performance. Moreover, Java classes can be used in server-side-based user interfaces. One such example is the Oracle application development framework (ADF) provided by Oracle's Fusion middleware. Oracle ADF comes with many different visualization components allowing for agile drag-and-drop development capabilities.

The herein-below solution includes creating a framework to provide a map from the existing legacy applications (comprising legacy forms-based UIs) and then mapping them to the modern user interface objects (e.g., using modern UI paradigms and APIs).

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A exemplifies an environment 1A00 in which systems for automatically recasting a form-based user interface into a mobile device user interface using common data can be deployed. As an option, one or more instances of environment 1A00 or any aspect thereof may be implemented in the context of the architecture and functionality of the embodiments described herein. Also, the environment 1A00 or any aspect thereof may be implemented in any desired environment.

As shown, external systems 102 (e.g., a mobile device $102_1$, a smart phone $102_2$, a tablet $102_3$, a phablet, a platform $102_4$, etc.) can communicate with a middleware components (e.g., such as a web services server, or other middleware components) via requests $104_1$ and responses $106_1$ over any known methods or protocols. The mobile device $102_1$, a smart phone $102_2$, a tablet $102_3$, a phablet, or other platform$102_4$, etc. can host a web client 103, and the web client can display forms and handle various user interaction events such as clicks, or touch, or keyboard entry.

The shown middleware can comprise a service proxy. Requests from the external systems 102 can be processed by middleware and/or request processors (e.g., form service request processor 112). The middleware can send any number of requests $104_2$ to the backend system 116 (e.g., to reach any pre-processors or support processes). Such pre-processors or support processes can be implemented by or in a Java application server (e.g., see FIG. 1B) or other process configured to receive the aforementioned requests. The service proxy can receive any number of responses $106_2$ from the backend system. In some cases the responses $106_2$ are formatted as one or more instances of a JSON message.

The backend system 116 can comprise a variety of processes, application servers (e.g., JAS), desktop environments, applications 124, and databases and/or database engines 126.

The shown application server 118 can host any number of applications (e.g., applications 124) and/or any number services (e.g., form services, etc.). The services can receive any number of requests $104_2$ (e.g., a request for a form application, etc.). Received requests can be processed by any number of form service request emulators. Strictly as one example, an instance of a form service request emulator can receive a request (e.g., request $104_2$) as originated from a non-backend system (e.g., see external systems 102) in the form of a URI post, and modify the received URI post to so as to comport with a format or formats as are used by the application server and/or applications.

The form service request emulators can communicate with application server 118, and/or the applications 124, and any application (e.g., application $124_1$, application $124_2$, application $124_3$, etc.) can implement business logic 125, and any application can comprise any number of modules (e.g., application modules) to perform processing of forms.

The shown applications can communicate with a database engine 126, and the database engine 126 can hold instances of forms 107 and instances of form metadata 113. Forms and form metadata can be stored and/or cached in one or more locations accessible to the backend system. Form metadata 113 can include or be stored with one or more form identifiers 109, which identifiers serve to uniquely name a form. Some exemplary uses of form identifiers 109 include identification of any aspects of the form, including identification of form fields, for example, using form field identifiers 111.

The middleware 108 and/or the backend system can host an application interface services server or portion thereof. One possible partitioning of an AIS as is shown and described as pertaining to FIG. 1B.

Figure 1B:
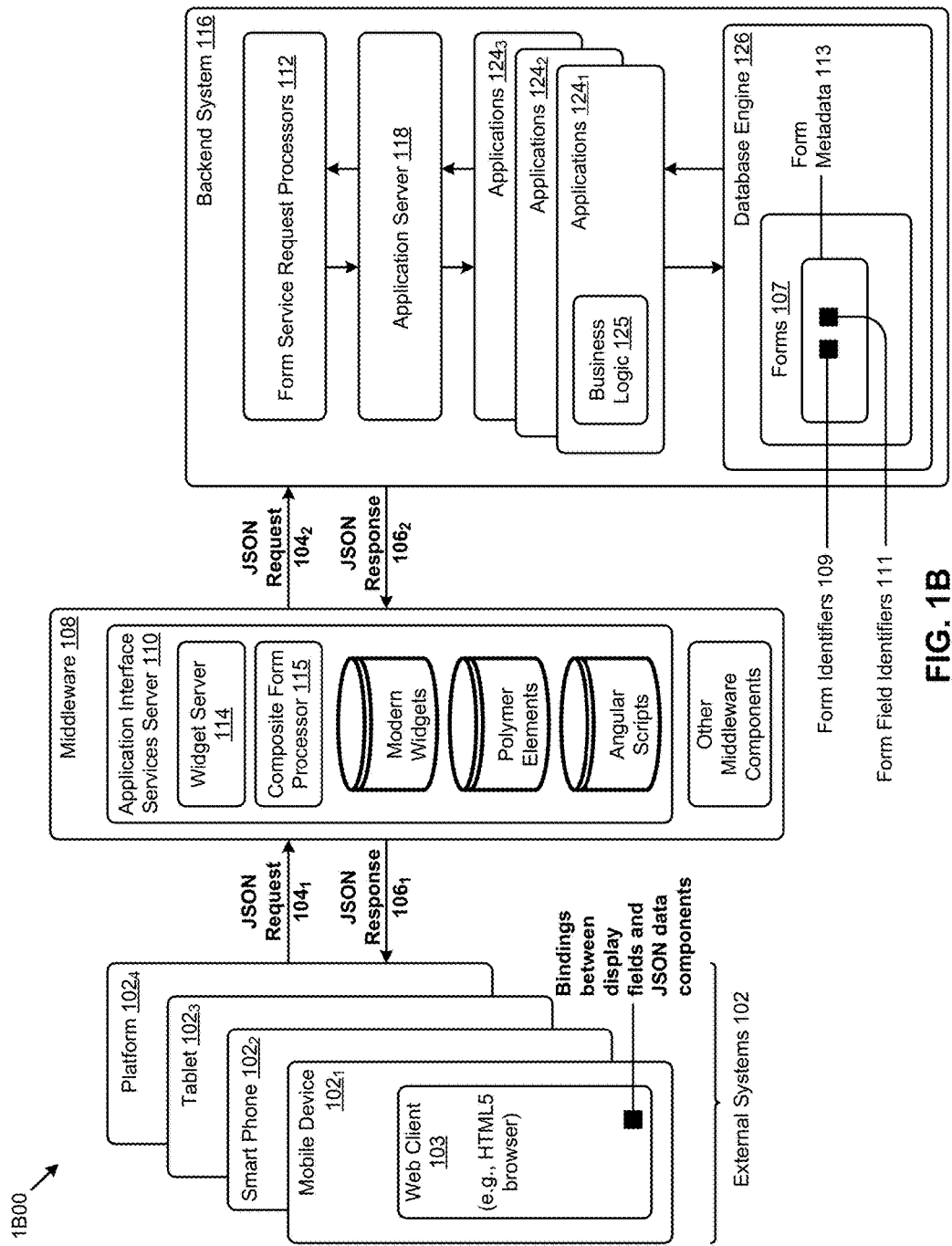
FIG. 1B exemplifies an environment including an application interface services server to perform services that facilitate population and operation of a mobile device user interface using common data widgets using JSON messaging, according to one embodiment.

FIG. 1B exemplifies an environment 1B00 including an application interface services server to perform services that facilitate population and operation of a mobile device user interface using common data widgets using JSON messaging. As an option, one or more instances of environment 1B00 or any aspect thereof may be implemented in the context of the architecture and functionality of the embodiments described herein. Also, the environment 1B00 or any aspect thereof may be implemented in any desired environment.

FIG. 1B depicts a Java-oriented environment for hosting middleware emulation services based on metadata of forms 107, the data from which forms are used in backend business logic. As shown, the backend system 116 can comprise of any of a variety of application servers such as the shown Java application server (JAS), applications 124, and database engines 126.

External system 102 can communicate with the backend system 116. The external system can send a service request (e.g., request $104_1$) in the form of JSON message payload, and any of the middleware components can in turn issue a request $104_2$ in the form of a JSON message that carries the form data payload. In this partitioning, middleware components process responses from the backend system application or applications, and forwards response $106_2$ in the form of a JSON message (e.g., to contain the results of processing a service call) to the requestor. As such, the external system can receive a response $106_1$ in the form of a JSON message from the middleware components.

A JSON message can comprise any number of a variety of values, including user-supplied data and/or metadata. User-supplied metadata might comprises an application name, an application version (e.g., a version number), and a user credential (e.g., a user name, a password, etc.). In some cases additional parameters are included in a JSON message payload.

A JSON message payload can comprise data such as the data to be sent to the business logic and/or can comprise references to operations to be performed when the form runs (e.g., set name_field="Joe", then set title_field="manager", then "press ok").

The foregoing format (e.g., <"fieldname"="value">) is merely one example for passing a setting. Reasonable formats have many variations. For example, one embodiment passes parameters into an application using interfaces exposed by the application. Other possibilities include formats to specify execution of "create", "read", "update" and "delete" operations by the backend business logic behavior. In some embodiments, the parameter set interface allows for data values to be passed for assignment to any data field that is exposed by the form. In yet other embodiments the parameter set interface allows for flow control of the process and/or for performing any action or series of actions that is or can be exposed by a web client 103. For example, one or more instances of a JSON message payload can include an indication of one or a series of actions (e.g., S1, S2, . . . SN) such as:

S1: Put <"ValueA" in field "X">
    S2: Put <"ValueB" in field "Y">
    S3: Press <any button>
    S4: Put <"ValueB" in field "Y">
    S5: Press <button B>
    S6: Return <status based on current state of the application>
    SN: <additional action(s)>.

Further details regarding a general approach to accessing application services from forms are described in U.S. application Ser. No. 14/463,532, titled, "ACCESSING APPLICATION SERVICES FROM FORMS" filed Aug. 19, 2014, which is hereby incorporated by reference in its entirety.

The application interface services server 110 comprises a widget server 114, a composite form processor 115, and datasets such as a dataset comprising user interface screen devices and/or corresponding scripts (e.g., modern widgets, a dataset comprising Polymer elements, a dataset comprising Angular scripts, etc.). Such datasets facilitate a user interface design paradigm shift from an initial emphasis on functionality to an initial emphasis on core path facilitation. In fact, and as is herein-disclosed, a modern UI can be generated based on a core path specification.

FIG. 1C1 and FIG. 1C2 compare a grid-based user interface model 1C100 with a mobile device user interface model 1C200 using common data widgets, according to one embodiment.

Specifically, and as shown in FIG. 1C1, a user interacts with a client user interface 132 in conjunction with a client application. The shown client user interface 132 and client application 134 are often deployed on mobile devices (e.g., mobile device $102_1$, smart phone $102_2$, tablet $102_3$, etc.) and can communicate through to backend applications 140 using a client-to-services interface (e.g., client interface 136), possibly using a middleware services 138 (e.g., such as a web services server or other middleware components). Such a stack of layers of services and/or organization or protocols between components of the stack of layers might have been deployed for a long period of time, and might be known to be stable. For example, and as shown and discussed further as pertaining to FIG. 3, the client-side 130 execution of a client user interface 132 might present a form having form fields, and might be organized into a grid of form fields such that the form fields are associated with operations taken by the middleware services 138 or by the backend applications 140. Application data that is displayed by or inserted into a form field can be used by the middleware services 138 or by the backend applications 140 independent of the method of user interface capture or display. For example, data captured by a form field in a grid can be captured by a user entry of a text value, or data captured by a form field in a grid can be alternatively captured by a user selection of a pull-down menu item, or data captured by a form field in a grid can be alternatively captured by a user entry of a radio button selection, or using any other widgets or graphical user interface capture techniques.

As can be understood, independence between the user interface and backend service can be facilitated at least in that alternative graphical user interface capture techniques can be used without affecting the operation of middleware services 138 and/or alternative graphical user interface capture techniques can be used without affecting the operation of the backend applications 140. Such independence establishes a data-wise and operation-wise independence such that a grid-based user interface model can be transformed into a mobile device user interface model through exploitation of the commonality of data regardless of the selection of specific widgets or graphical user interface capture techniques. This then presents a framework whereby widgets other than the grid-oriented form fields can be used to render an alternative user interface (e.g., using modern UI widgets 142), possibly using a set of interface application programming interface calls (e.g., modern UI APIs 144). FIG. 1C2 depicts such a framework.

FIG. 1C2 depicts additional layers of processing that support design and implementation of a UI that is developed using modern UI widgets 142 that interface with modern UI APIs 144. In one embodiment, graphical user interface elements used in the shown client user interface 132 are transposed into modern UI widgets 142 based on common data. In some embodiments, the transposition into modern UI widgets 142 can include selection of widgets that are selected based on observations of frequently used user patterns and/or from a description or codification of a core path specification. In some cases, the description or codification of a core path specification is derived from a paradigm shift that facilitates user interface presentation on small form factor devices such as a smart wrist watch.

Figure 2A:
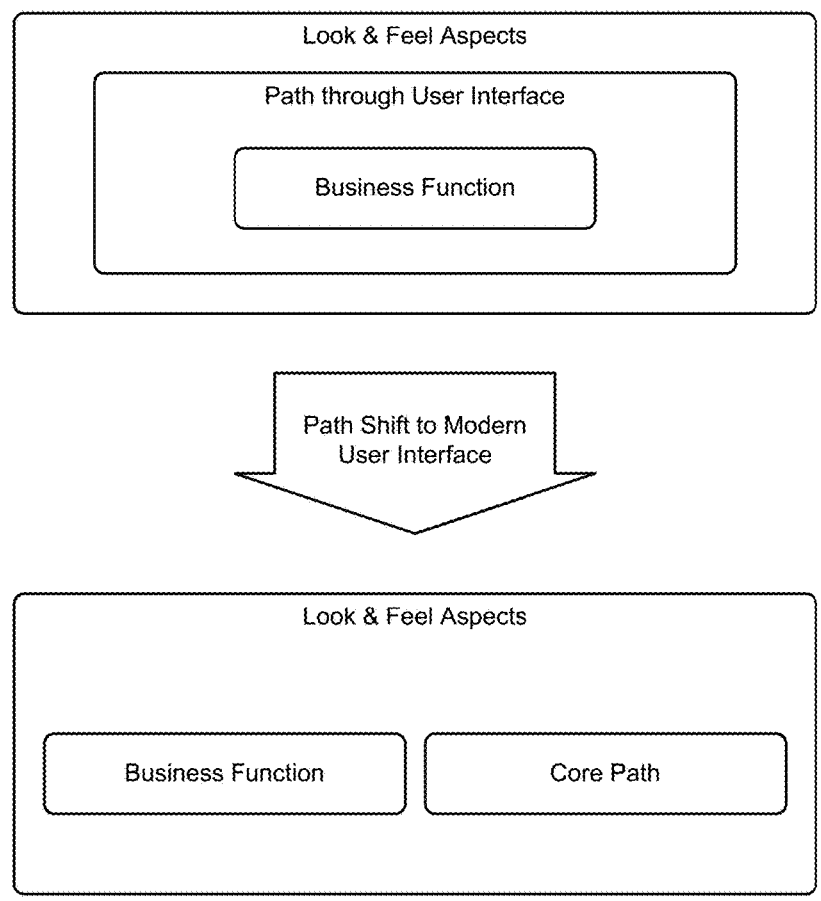
FIG. 2A depicts a paradigm shift to a model where a UI is developed from a core path specification, according to one embodiment.

FIG. 2A depicts a paradigm shift 2A00 to a model where a UI is developed from a core path specification. As an option, one or more instances of paradigm shift 2A00 or any aspect thereof may be implemented in the context of the architecture and functionality of the embodiments described herein. Also, the paradigm shift 2A00 or any aspect thereof may be implemented in any desired environment.

As shown in FIG. 2A, the paradigm shift facilitates improved user interface design. The paradigm shift transitions from the business function being the design focus of a UI design to the core path being the design focus. Other aspects of the UI are built around the core. More specifically, the modern user interface paradigm supports:

Use of visual hierarchy in a way that naturally directs the user's attention to the relevant point on the screen.
Hiding irrelevant or distracting data.
Presenting a more modern look and feel.
Delivering a responsive design, including visual feedback on interaction and ability to self-change to serve alternate form factors such as tablets, mobile devices, etc.

The spec-based nature of certain enterprise applications and the re-use of generic components facilitates service-oriented architectures. Once a set of services is defined and implemented (e.g., in a framework) such services can be offered to every existing conforming application. This service-oriented architecture facilitates the provision of situation-specific wrappers that are wrapped around enterprise applications. Indeed, the ability to build lightweight wrappers aligns with the priorities of UI simplification and modernization. As a philosophy, application and application user interface designs should facilitate progressing through the "most important things" well (e.g., along a core path), and then, advanced functionality should be made available in a way that doesn't make the progression more cumbersome. A progression or core path can be applied to the presentation of data to a user and/or can be applied to the collection of data from a user. In some situations, the presentation of data is prioritized over the collection of data. In some situations, the collection of data is prioritized over the presentation of data. In either case a core path philosophy can be applied so as to present data and collect data in a progression and manner that presents or collects the "most important things". Moreover the "most important things" (e.g., along a core path) can be presented using modern UI widgets. For example, one possible framework extension that is consistent with the core path philosophy and core path specification technique is to build custom front-ends to these applications using a web-components framework, such as Polymer. Potential uses for this technique include:

Tailoring the user experience to meet the business process as it exists at a particular customer (e.g., eliminating fields and boilerplate that customer does not leverage).
Streamlining complicated, multi-form processes to a simpler interaction paradigm. (e.g., creating a single "polymer form" that wraps multiple forms).
Customizing the visual experience to match a company's look and feel or to more seamlessly integrate with other systems.

Core Path

One technique for recasting a form-based user interface into a modern UI uses a traversal-based approach that relies in part on quantitative field-usage statistics. Application monitoring tools and pre-processing tools can be used to automatically capture core path statistics (e.g., during ongoing operation of a form-based UI), and then generate a core-path specification based on the captured and pre-processed statistics. For example, the statistics can be used to build a probabilistic model of field usage, which in turn can be used to generate a probabilistic path.

Such a traversal-dominant approach can be in conjunction with data-dominant approaches. In some cases, a traversal-dominant approach based on statistical models is used as a primary guide, which is then supplemented by data-dominant concepts. Enterprise applications can exist in multiple forms simultaneously (e.g., desktop forms, tablet forms, cell-phone forms, and smart-watch forms, etc.) and the traversal-dominant approaches and/or the data-dominant approaches can be used for automatically converting one form into multiple different forms.

Data Capture

Enterprise software applications are architected so as to capture user interactions (e.g., because there is often some action taken in response to a user interaction). For instance, if a user clicks a button, the software must respond in some way. Accordingly, the enterprise application detects what action the user has initiated (e.g., a click or other UI event) even before invoking any action in response. Further, user actions such as entering text into a field and/or tabbing out of a form field can be captured and persisted on a server.

Form events can be codified as instances of a common generic event. Events may contain an event type (e.g., an "Event_type"), a field identifier (e.g., a "Field_ID"), and an event value (e.g., a "Value"). Strictly as examples, an event type might be codified by the value entered in a text field, and a field identifier can be formed to include a unique code or other sort of identifier. The event value can be any value, such as a string, as in "7600 Technology Way". Another example has: "Event_type=button_clicked", "Field_ID=22", and "Value=null". The core path through the application can be inferred by capturing and logging the event stream, and applying statistics to the logged event stream.

Assembling the Core Path

The aforementioned inferences can be used to identify which fields are (or are not) on the core path. A histogram of how the form fields are used (e.g., 0-5%, 5-10%, 10-15%, etc.) can reveal a multi-modal distribution. For example, a user of a particular application might exhibit the pattern that a first group of fields are used in almost every invocation, a second group of fields are used about half the time, and a third group of fields are almost never used. The first group could deemed to be a first "core path", the first and second group combined could be deemed to be a second "core path" or a "common path", and the third set of fields might not be classified.

In some cases, the process of app design could employ a layered approach. For example, only the first core path is shown at initial presentation, and the initial presentation includes a "More . . . " control to show second core path fields. Further, there may (or may not) be an "Advanced>>" control to show all fields. Going further, processing can include, "Is the field part of the core path: yes/no" analysis. By looking at the order in which fields are used, a probabilistic map of how users traverse an application can be codified. A state transition model can be built from the map of traversals. Such a state transition model can be built on Bayesian probabilities. Some probabilistic models look backwards to consider multiple events. Such Bayesian probabilities can be included in a learning model. The learning model might include a predictor to determine the likelihood of a "next" field. (e.g., Field B is "next" 87% of the time after Field A, Field C is "next" 12% of the time after Field A, etc.).

The learning model can be used to generate a probabilistic map of the path that users traverse through the form elements. A reduced or simplified or streamlined "core path" UI can be generated. Some implementations might recognize multiple core paths. A threshold percentage might be employed in combination with a rule or rules. For example, Rule1: "If the most common next field is used >=70% of the time, then only present that one option". Rule2: "If the most common next field is used less than 70% of the time, present additional options until at least 70% of use cases are covered". Different forms of a UI might be associated with different thresholds and/or rules. For example, it might be that a tablet has a 90% threshold for a particular rule, and a cell phone has a 70% threshold for that same rule, and smart-watch has a 50% threshold for that same rule.

Core path analysis and generation can implement many variations. For example, heuristic methods can be used to determine how close a particular field is to the top of the page or dialog. It is also possible to generate a modern app that is customized to each user based on that user's event log. Still further, feedback from usage of the generated modern app itself can also be used to inform the modern UI generator so that, for example, if a user's logged events show that the user very often clicks on the "More . . . " button to see extra fields, then those extra fields might be selected to be included an improved user-specific UI.

Hosting

There are many partitioning possibilities where Polymer-based web-apps could be hosted. For example, they can exist on the JAS server itself, possibly as page object. Various partitions allow the wrappers to be built and hosted on virtually any server.

Figure 2B:
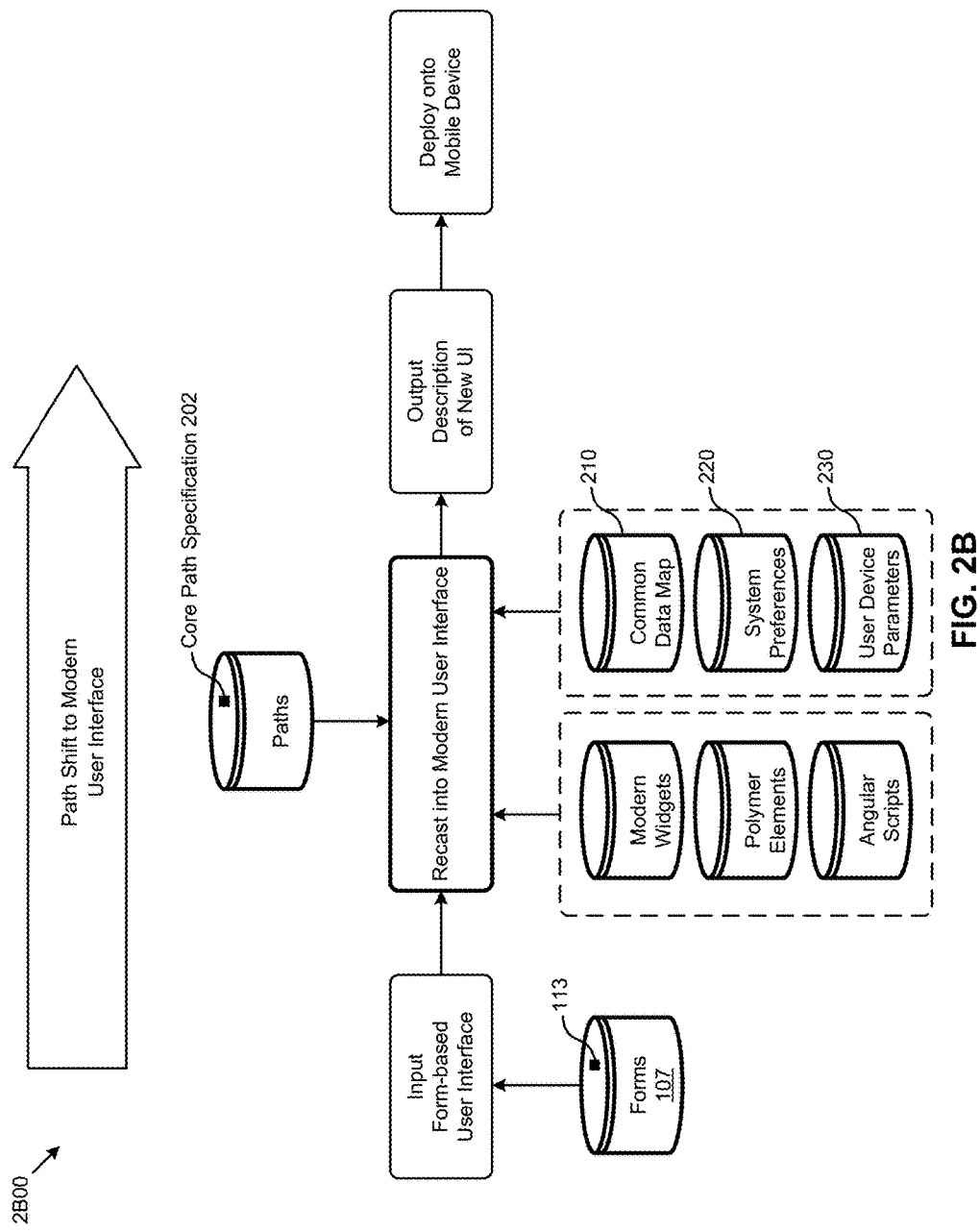
FIG. 2B depicts an implementation and deployment flow for enabling a UI based on a core path specification, according to one embodiment.

FIG. 2B depicts an implementation and deployment flow 2B00 for enabling a UI based on a core path specification. As an option, one or more instances of implementation and deployment flow 2B00 or any aspect thereof may be implemented in the context of the architecture and functionality of the embodiments described herein. Also, the implementation and deployment flow 2B00 or any aspect thereof may be implemented in any desired environment.

As shown in FIG. 2B, the implementation and deployment flow comprises a flow as follows:
Input form-based user interface components and/or specifications.
Recast into a modern user interface (e.g., based on a core path specification 202).
Deploy the modern interface onto a mobile device.

Such a progression recasts a desktop-oriented forms-based UI into a path-based UI suited for deployment on a wide range of mobile devices, including very small form factor devices such as a smart wrist watch.

The processes invoked when recasting access various data repositories. For example, a process to recast into a modern user interface can access a common data map 210, which serves to identify a particular widget or script (e.g., the shown modern widgets, Polymer elements, and/or Angular scripts, etc.). The selection of a particular widget or script can be facilitated by any combinations of system preferences 220 and/or user device parameters 230. For example, whereas a form-based user interface might present a data or dates in a columnar format, a system preference might be used to generate a mapping to a widget that presents dates in a calendar format. Further, whereas a form-based user interface might present a data or dates in a columnar format, one or more user device parameters might be used to generate a mapping to a widget that presents dates in a calendar format with a scrolling or touch-based user interface so as to facilitate presentation and interaction on a small screen, such as on very small form factor devices such as a smart wrist watch.

In some situations, a core path (e.g., comprising the order of fields to be presented and/or interacted upon) is specified using a computer-readable core path specification. Also, and as shown, a form can be specified using a computer-readable specification, (e.g., using form metadata 113 as shown in FIG. 2B). Such a specification can comprise operations corresponding to fields, and any operation and/or field can be operated upon by a form service. Moreover, data describing a form and/or facilities of a form service can codify the characteristics of the data used in a form. One example of a relationship between forms, operations, and data is given as shown and described as pertaining to the following FIG. 3 and FIG. 4.

Figure 3:
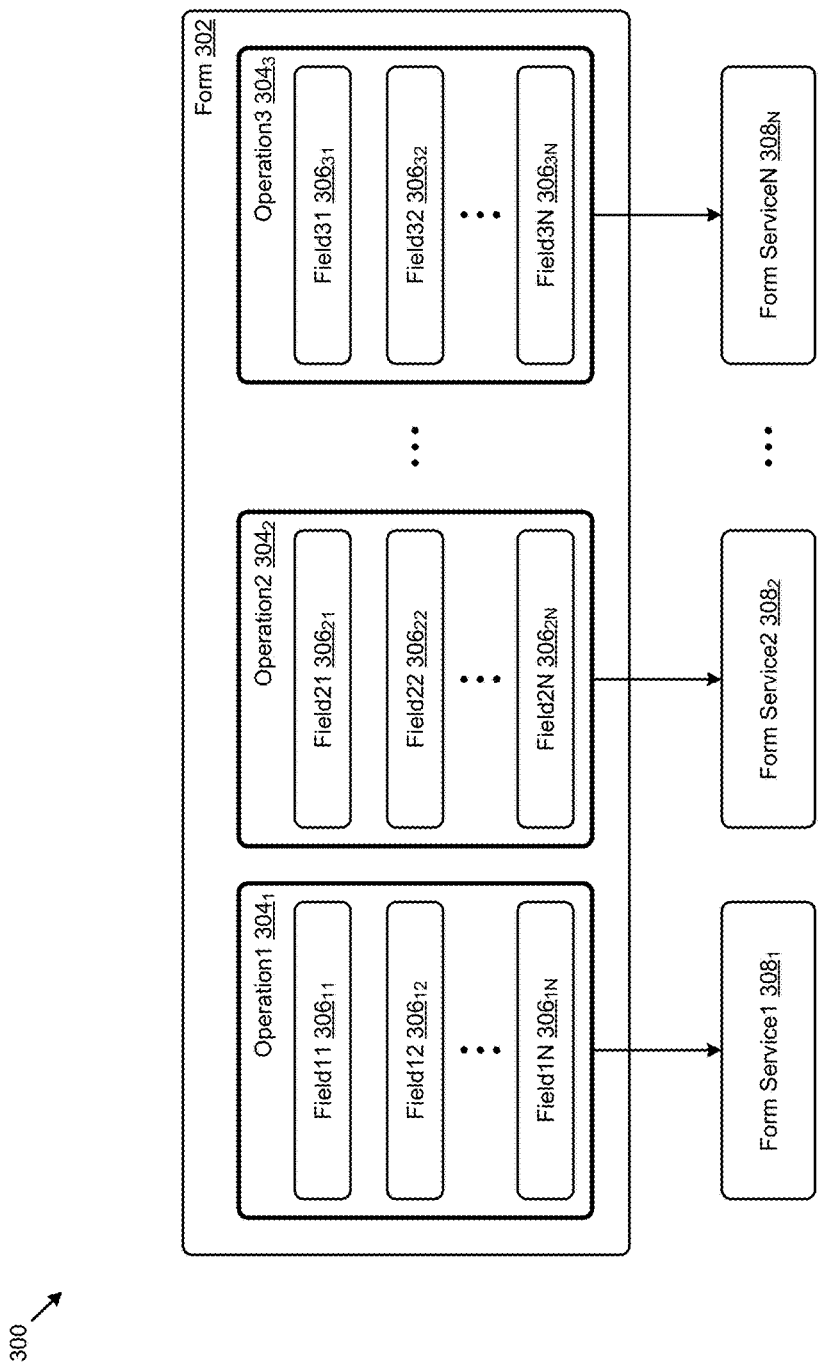
FIG. 3 is a relationship diagram to show relationships between forms, operations and data as used in systems for automatically recasting a form-based user interface into a mobile device user interface using common data, according to one embodiment.

FIG. 3 is a relationship diagram 300 to show relationships between forms, operations and data as used in systems for automatically recasting a form-based user interface into a mobile device user interface using common data. As an option, one or more instances of relationship diagram 300 or any aspect thereof may be implemented in the context of the architecture and functionality of the embodiments described herein. Also, the relationship diagram 300 or any aspect thereof may be implemented in any desired environment.

As shown, form 302 (e.g., a payroll form, an accounts payable form, etc.) can comprise any number or variety of operations 304 (e.g., operation $304_1$, operation $304_2$, operation $304_3$, etc.) and fields 306 (e.g., field $306_{11}$, field $306_{12}$, field $306_{22}$, field $306_{3N}$, etc.). The operations may refer to a create operation, a read operation, an update operation, a delete operation, etc. and can have any number of associated fields (e.g., a field representing a name, a date, an address, etc.). An operation and its associated field or fields can map to a service (e.g., form service $308_1$, form service $308_2$, form service $308_N$, etc.). A form can have any number of operations and an operation can map to any number of services.

Figure 4:
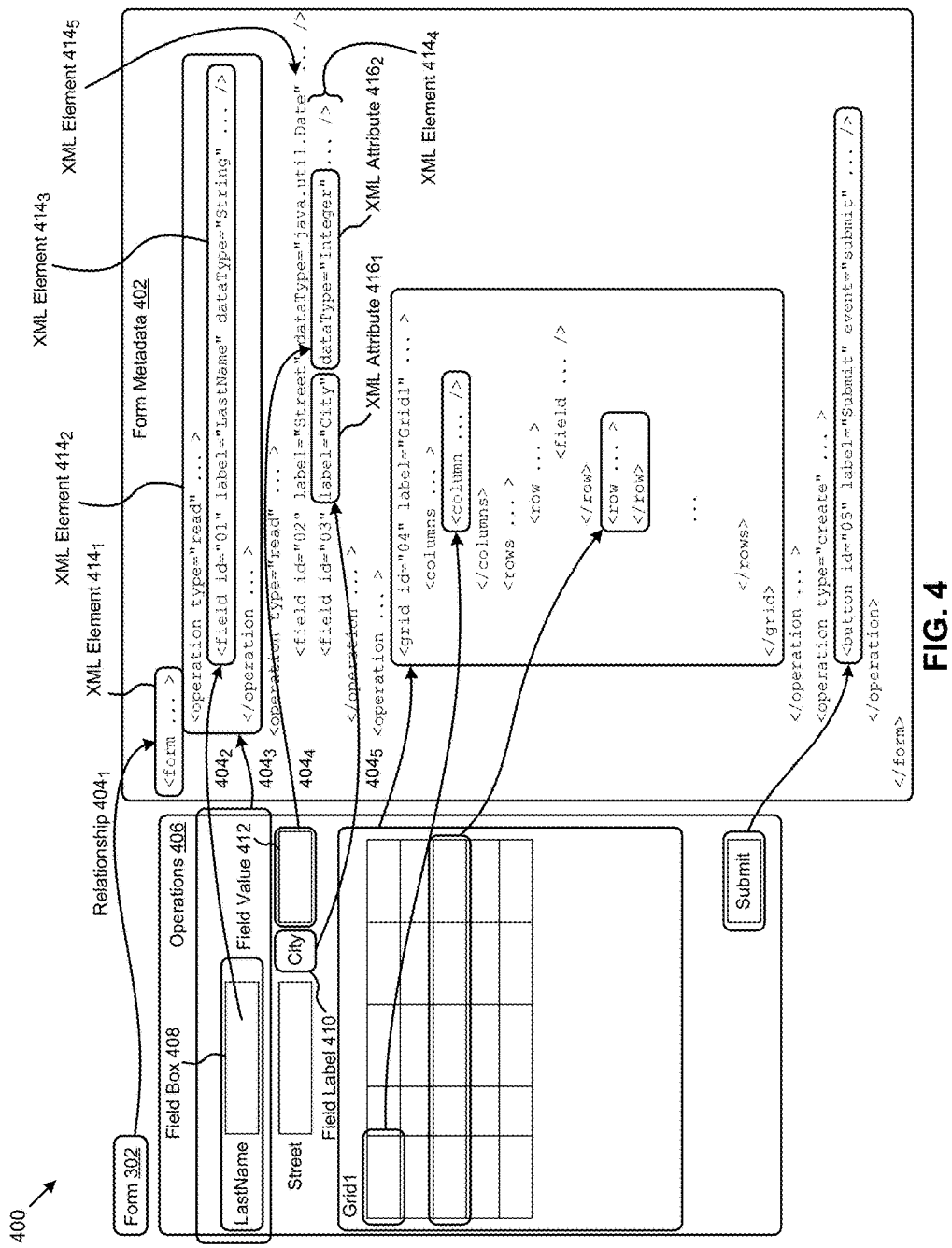
FIG. 4 is a mapping diagram to illustrate relationships between form fields and form metadata as used in system for automatically recasting a form-based user interface into a mobile device user interface using common data, according to one embodiment.

FIG. 4 is a mapping diagram 400 to illustrate relationships between form fields and form metadata as used in system for automatically recasting a form-based user interface into a mobile device user interface using common data. As an option, one or more instances of mapping diagram 400 or any aspect thereof may be implemented in the context of the architecture and functionality of the embodiments described herein. Also, the mapping diagram 400 or any aspect thereof may be implemented in any desired environment.

As shown, a mapping can define any number of relationships 404 between form 302 and any instances of form metadata can be codified using any known technique (e.g., using XML, using BNF, etc.). Strictly as an illustrative example, the form metadata can be comprised of XML elements that correspond to respective form components 402 (e.g., operations, fields, grids, buttons, etc.). Form metadata can describe the structure and any other aspects of a form and/or its components.

As shown, a relationship given in form metadata maps the form 302 to an XML element $414_1$. Operations 406 can have any number of associated instances of fields. Relationship $404_3$ maps the operation 406 to an XML element $414_2$. The XML element $414_2$ can comprise of any number of a variety of attributes (e.g., type, etc.). A relationship $404_2$ can map the field given in field box 408 to an XML element $414_3$. XML elements (e.g., XML element $414_3$, XML element $414_4$, etc.) can comprise any number of a variety of attributes (e.g., id, label, data type, Java class and method, etc.). A relationship can map a field label 410 (e.g., city, etc.) to an XML attribute $416_1$ (e.g., label, etc.). A relationship $404_4$ can map a field value 412 to an XML attribute $416_2$ (e.g., data type, etc.) using the shown XML element $414_4$, or using a Java data type identifier such as the Java class and method shown in XML element $414_5$.

The foregoing is merely one implementation, and other embodiments might directly produce maps in JSON formats rather than in XML formats. In some cases, the relationships 404 include maps to/from operations 406 using a data structure or a hardcoded map. Runtime processes identify the form that is running (e.g., via a form identifier, or via an inference) and, based on the components used in the identified form (e.g., a date field, a drop down, grid rows, etc.), produces a JSON representation of that form.

Further details regarding a general approach to using JSON representations are described in U.S. application Ser. No. 14/179,548, titled, "RULE-BASED AUTOMATIC CLASS GENERATION FROM JSON MESSAGES" filed Feb. 2, 2014, which is hereby incorporated by reference in its entirety.

Figure 5A:
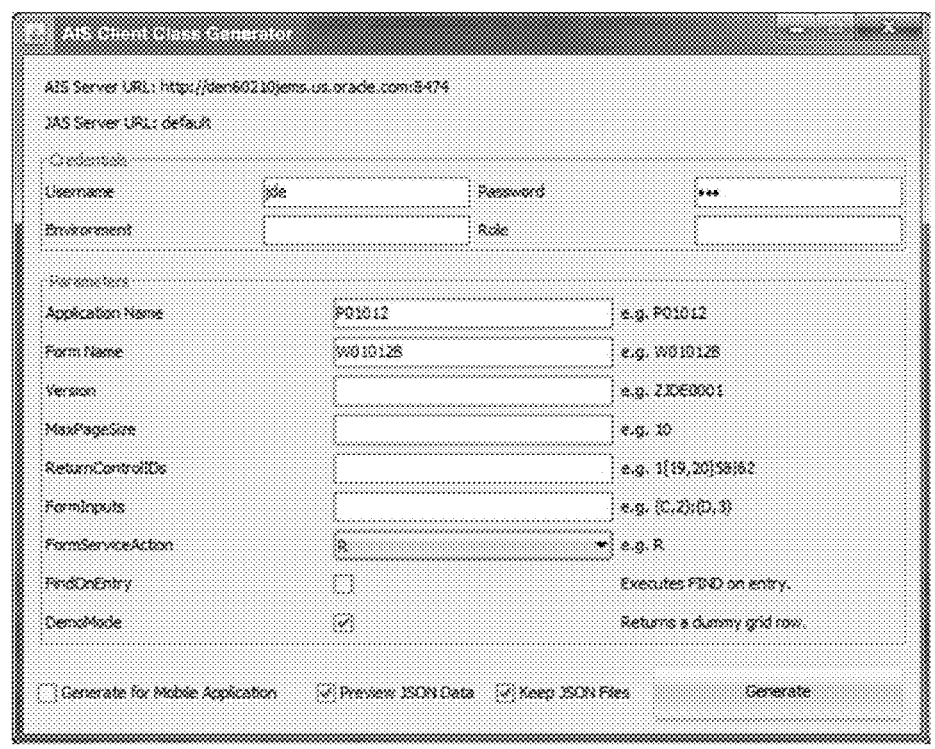
FIG. 5A is a depiction of a configuration screen used to specify form properties used in an application interface services module, according to one embodiment.

FIG. 5A is a depiction of a configuration screen 5A00 used to specify form properties used in an application interface services module. As an option, one or more instances of configuration screen 5A00 or any aspect thereof may be implemented in the context of the architecture and functionality of the embodiments described herein. Also, the configuration screen 5A00 or any aspect thereof may be implemented in any desired environment.

The configuration screen 5A00 comprises one possible implementation and set of values and their ranges and defaults:

MaxPageSize: Indicates the max rows to return in the grid.

ReturnControlIDs: Indicates which form/grid fields the service passes back.

FormInputs: Collection of id-value pairs that represent the form interconnect input to the form.

Version: Version of the application (e.g., ZJDE0001).

FormName: App and form name (e.g., P01012_W01012B).

FormServiceAction: The CRUD operation the form will perform, e.g., "R" for READ).

Environment: The environment that was used to request the token.

Role: The role used to make requests.

Embodiments of configuration screen 5A00 can further be used to define a set of actions to be performed on the form, possibly observing a particular ordering of fields (e.g., in the order listed). Such actions can include entering a value into a form field, a QBE field, selecting a radio button, pressing a button, selecting a checkbox value.

The contents of the form can be output to any of a range of representations. The following FIG. 5B is one possible representation.

Figure 5B:
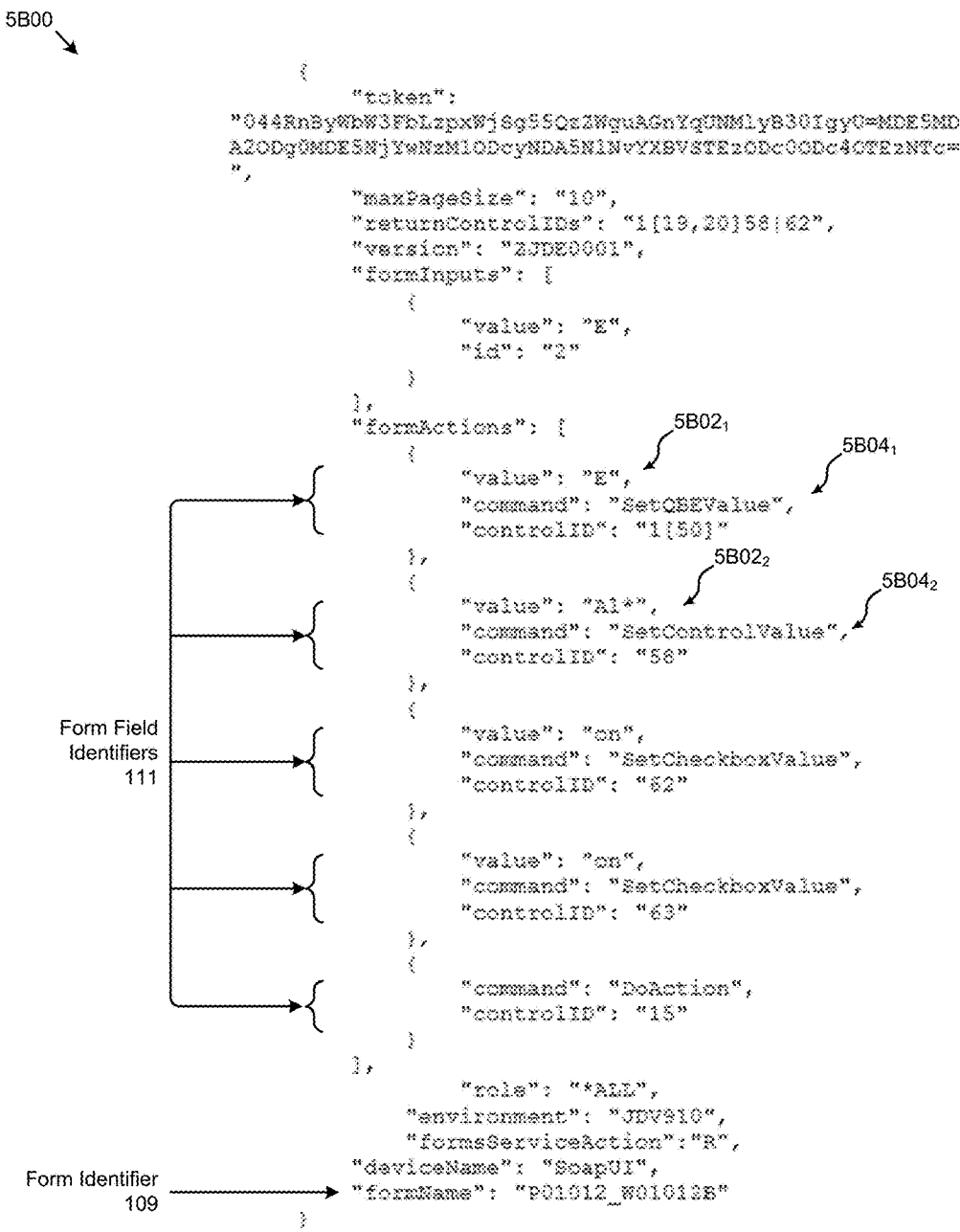
FIG. 5B depicts configuration screen output comprising form properties used in an application interface services module, according to one embodiment.

FIG. 5B depicts examples of configuration screen output 5B00 comprising form properties used in an application interface services module. As an option, one or more instances of configuration screen output 5B00 or any aspect thereof may be implemented in the context of the architecture and functionality of the embodiments described herein. Also, the configuration screen output 5B00 or any aspect thereof may be implemented in any desired environment.

As shown in FIG. 5B, the configuration screen output comprises a form identifier 109 and a series of form field identifiers 111. Any portions of the configuration screen output can be used as a portion of a specification for services used in an application interface services module. As can be seen, the form field identifiers 111 portion of the configuration screen output includes a data values 5B02 (e.g., data value $5B02_1$, data value $5B02_2$, etc.), and commands 5B04 (e.g., command $5B04_1$, command $5B04_2$, etc.). The data values 5B02, possibly in combination with commands 5B04 and/or any operations associated with the commands are used when automatically recasting a form-based user interface into a mobile device user interface.

FIG. 6A1 and FIG. 6A2 depict results of automatically recasting a form-based user interface into a mobile device user interface using common data, according to one embodiment.

The form-based scheduling user interface 6A100 depicts a "Requested Date" column and a "Start Date" column having respective requested date entries and start date entries pertaining to the shown rows. The grid-based form description includes a detailed description of the form fields (e.g., see form components 402), including the data type (e.g., see "datatype" within XML element $414_3$) and, in some cases, a data type is defined by a particular data object handler (e.g., see "java.util.Date" as shown in XML element $414_5$).

In the shown example, each of the rows having dates given in the "Requested Date" column and in the "Start Date" column are mapped to rows of the calendar form shown in the FIG. 6A2. Specifically, the rows having dates given in the "Requested Date" column and in the "Start Date" column are mapped to graphical elements of the calendar form whereby the left edge of a graphical element (e.g., a shaded rectangle) is shown at the position of the "Start Date", and the right edge of the graphical element is shown at the position of the "Requested Date".

FIG. 6B1 and FIG. 6B2 depict results of automatically recasting a form-based user interface into a mobile device user interface using common data. Specifically, the form-oriented depiction of FIG. 1B1 comprises a description column 630. Within the description column are a set of activities identified as tests (e.g., Test 567, Test 678, etc.), and each entry has an associated date pertaining to the work order scheduling (e.g., see the calendar dates of FIG. 6A2). In this example, the dates serve as common data for recasting the form-based scheduling user interface 6A100 into a mobile device work order scheduling interface 6A200.

There are many types of data visualizations suited for a mobile device user interface, and there are many types of common data that can derive from a form-based user interface. For example, a pie chart might be presented in a mobile device user interface, where the common data is derived from a form-based GUI showing a table of sales orders. The pie chart can show the portion of the total sales volume depicted in the rows of the aforementioned table.

Figure 7:
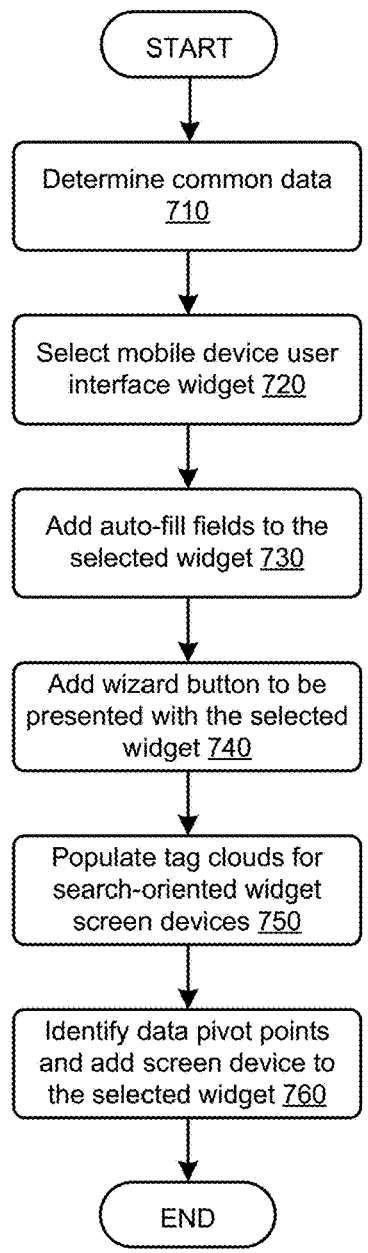
FIG. 7 depicts a mapping technique for automatically recasting a form-based user interface into a mobile device user interface using common data, according to one embodiment.

FIG. 7 depicts a mapping technique for automatically recasting a form-based user interface into a mobile device user interface using common data. The mapping technique relies in part on determining common data to be used between a form-based user interface and the data to be shown in a mobile device user interface (see step 710). Based on the determined common data, a mobile device user interface widget can be selected (see step 720). In some cases, and as shown, the selected mobile device user interface widget can be adorned with various user-interface screen devices, some of which are pre-populated based on data available within the environment hosting the form-based user interface. For example, auto-fill fields can be pre-populated into the fields of the selected mobile device user interface widget (see step 730); and/or a wizard prompt (e.g., a wizard button) can be presented on or with the selected mobile device user interface widget (see operation 740); and/or any search-oriented screen devices (e.g., a search box) can be pre-populated with common search terms or search tags, then presented on or with the selected mobile device user interface widget (see step 750); and/or secondary data items (e.g., data items that are attributes or facets of the determined common data) can be presented (e.g., using an additional screen device or widget) on or with the selected mobile device user interface widget (see step 760). In some cases the mobile device user interface can include a sliding progress bar, or a train-stop widget, or other progress indicator. An appropriate progress bar style can be selected based on the common data, or based on the mobile device, or both.

Yet another mapping technique for automatically recasting a form-based user interface into a mobile device user interface perform pivoting or faceting based on column headers. Multiple columns from a form-based user interface can be transformed for use with mobile device user interface screen devices.

The mapping technique 700 includes several one-to-many mapping relationships, and the technique includes selection from among multiple options (e.g., multiple screen devices). Additional mapping techniques are presented in Table 1.

TABLE 1

Recasting

| Form/Style | Applicable Modern Widgets | Common Data Type | Selection Filter(s) |
| --- | --- | --- | --- |
| Schedule | Calendar PERT Chart GANTT Chart Timeline Chart | Date or Date Range | Device Size, device aspect ratio |
| Interview or Questionnaire Form | Consecutive Sequence Conditional Sequence | Text Value | Device IO capabilities |
| Tabular grid data | Gauge Bubble Chart | Quantities (number of items, dollar amounts) | Device Screen resolution |
| Historic records | Thematic Map Choropeth Map | Location, GPS coordinates | Device Color Display Capabilities |
| Common data reference | Graphical portrait Embedded media display | Address number with associated picture | Device Media processing capabilities |

The mapping technique can be implemented using a variety of computer programming techniques, and the deployment and operation of a recasted UI to a user device can be facilitated using messaging (e.g., to/from middleware components). A JSON-centric implementation is give in FIG. 8.

Figure 8:
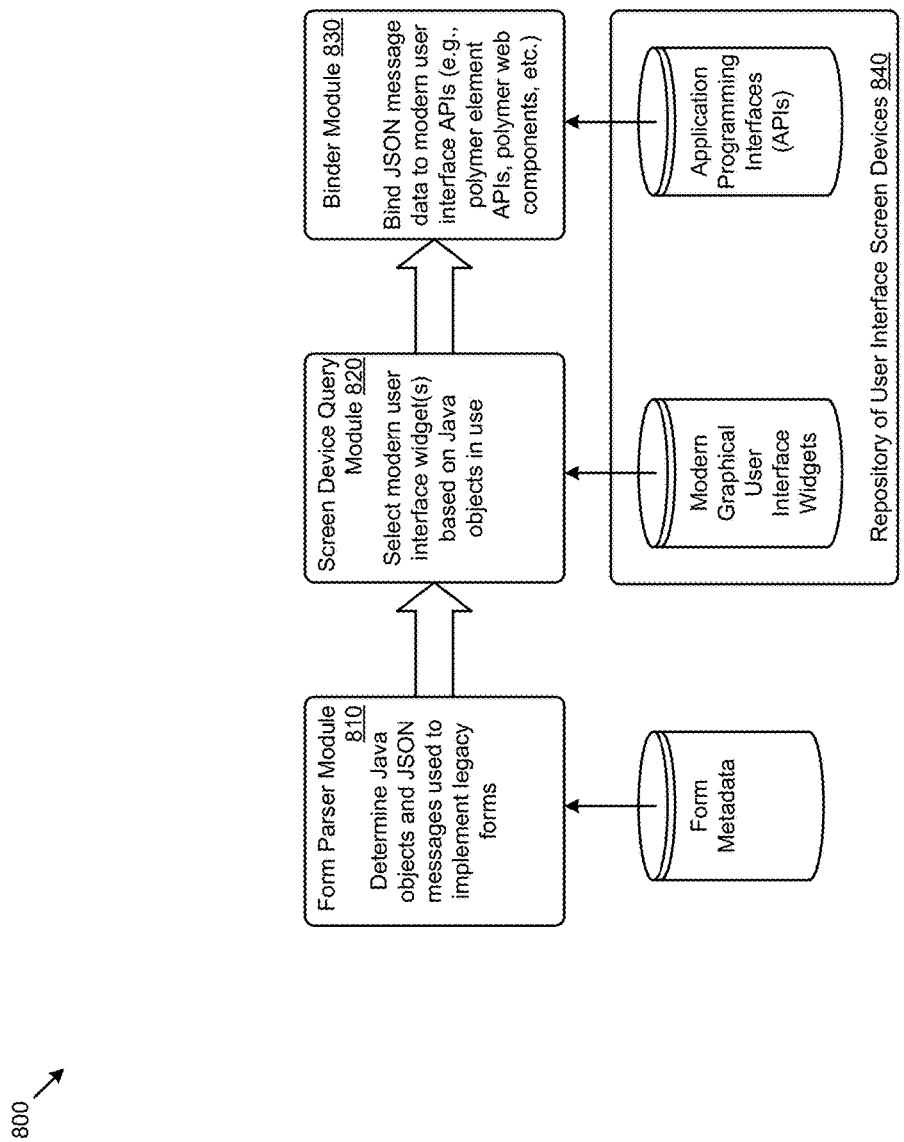
FIG. 8 depicts a data binding flow as used in systems to facilitate population and operation of a mobile device user interface using common data widgets that use JSON messaging, according to some embodiments.

FIG. 8 depicts a data binding flow 800 as used in systems to facilitate population and operation of a mobile device user interface using common data widgets that use JSON messaging. As an option, one or more instances of data binding flow 800 or any aspect thereof may be implemented in the context of the architecture and functionality of the embodiments described herein. Also, the data binding flow 800 or any aspect thereof may be implemented in any desired environment.

As shown in FIG. 8, the data binding flow comprises a flow commencing by determining a set of Java objects and JSON messages that correspond to a form-based UI (e.g., see form parser module 810). Upon knowing the form (e.g., from a form identifier) and the constituent form fields, the nature of the form fields and underlying objects can be known. When the nature of the underlying objects is known, then an appropriate widget or set of widgets can be selected (e.g., by a screen device query module 820) from a widget dataset (e.g., see repository of user interface screen devices 840). In some cases a particular JSON message can be bound to a particular modern widget. In other cases, an object can be mapped to an API (e.g., a Polymer API) and/or to a script (e.g., an Angular script). Once the binding is done (e.g., by the shown binder module 830), then (for example) the payload of a particular incoming JSON message that is bound to a particular (for example) Polymer API can provide the contents needed for display of the particular Polymer UI element. This flow is repeated until all objects (e.g., JSON message or Java objects) have been processed (e.g., mapped to a Polymer element or Angular script) and all API inputs have been bound to an object.

In some cases, the binding results from a mapping between aspects of a JSON message and a desired element. For example, a JSON message might capture the nature of a form grid cell, and the grid cell can be mapped to a button having similar characteristics. Strictly as one example, a JSON message might comprise a key-value pair that is recognized as a "Submit" button, and the mapped-to button might be of the form or button with the label "Submit". A one-to-one mapping is only one possibility. In another case, a group of JSON messages might comprise a group of aspects, and a desired user interface element can be selected such that the selected interface element can convey some, all, or more than the group of aspects. For example, when a group of aspects are recognized to comprise a group of dates (e.g., possibly with an event associated with the date), then a date oriented Polymer element (e.g., a calendar element) might be selected. In some cases the logic to select a particular interfaced element can amalgamate a large group of JSON messages and select a modern user interface element that serves to display all or substantially all of the data (e.g., key-value pairs) from the amalgamated set.

Such logic can be implemented in a selector module, and such a selector module can combine various mapping techniques as well as heuristics in order to automatically find one or more best-fit mappings. In some cases, the logic is extensible, and can operate over a data set of widgets (e.g., modern widgets), UI elements (e.g., Polymer elements), and/or scripts (e.g., AngularJS scripts).

Additional Embodiments of the Disclosure

Additional Practical Application Examples

Figure 9A:
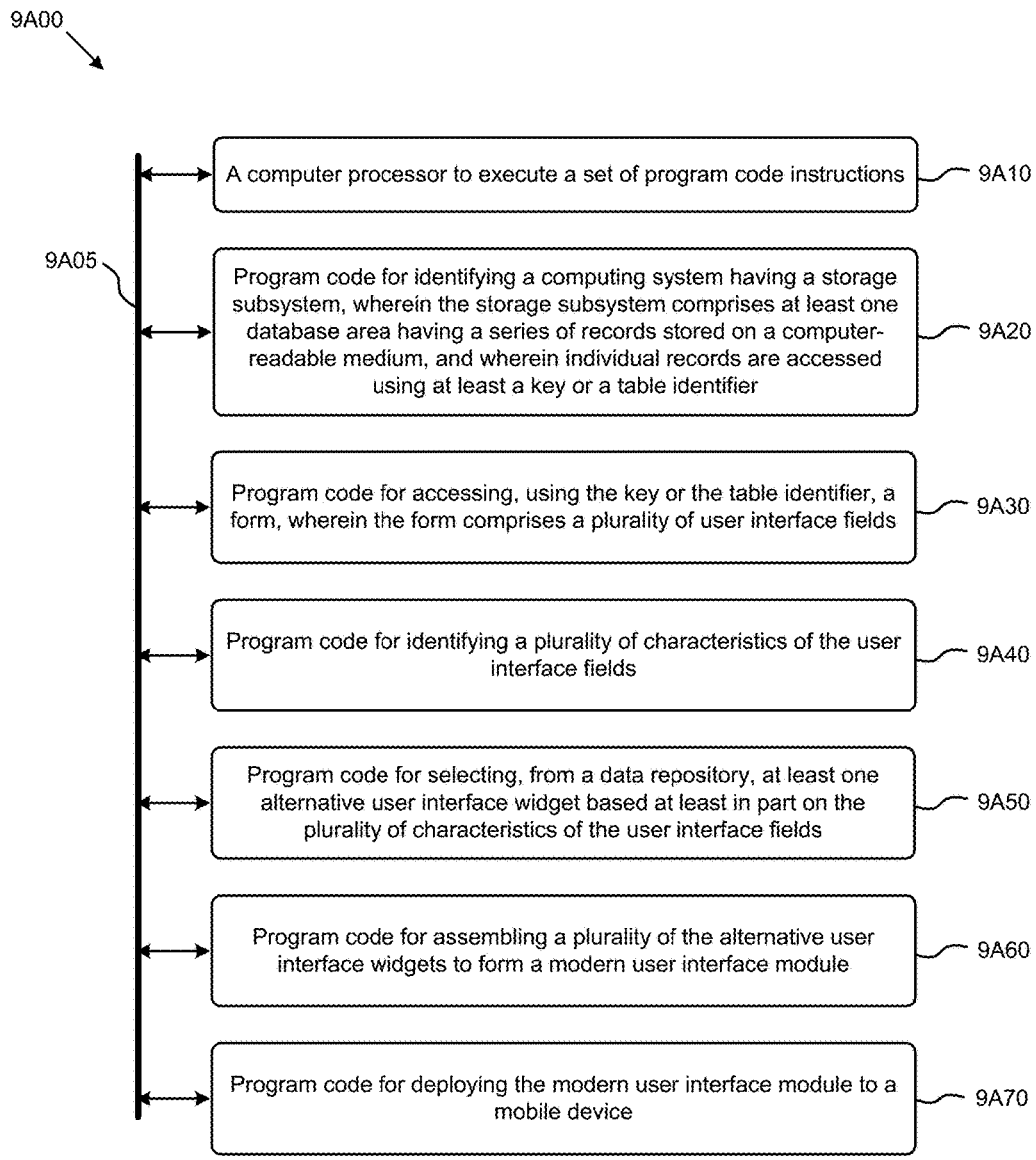
FIG. 9A and FIG. 9B present block diagrams of systems for implementing all or portions of any of the embodiments described herein.

FIG. 9A is a block diagram of a system for implementing all or portions of any of the embodiments described herein. As shown, the system is comprised of a processor (see module 9A10) and other operational modules interconnected over communication path 9A05. At least some of the modules comprise program code for: identifying a computing system having a storage subsystem, wherein the storage subsystem comprises at least one database area having a series of records stored on a computer-readable medium, and wherein individual records are accessed using at least a key or a table identifier (see module 9A20); accessing, using the key or the table identifier, a form, wherein the form comprises a plurality of user interface fields (see module 9A30); identifying a plurality of characteristics of the user interface fields (see module 9A40); and selecting, from a data repository, at least one alternative user interface widget based at least in part on the plurality of characteristics of the user interface fields (see module 9A50). The system shown further comprises program code for assembling a plurality of the alternative user interface widgets to form a modern user interface module (see module 9A60), and program code for deploying the modern user interface module to a mobile device (see module 9A70).

Figure 9B:
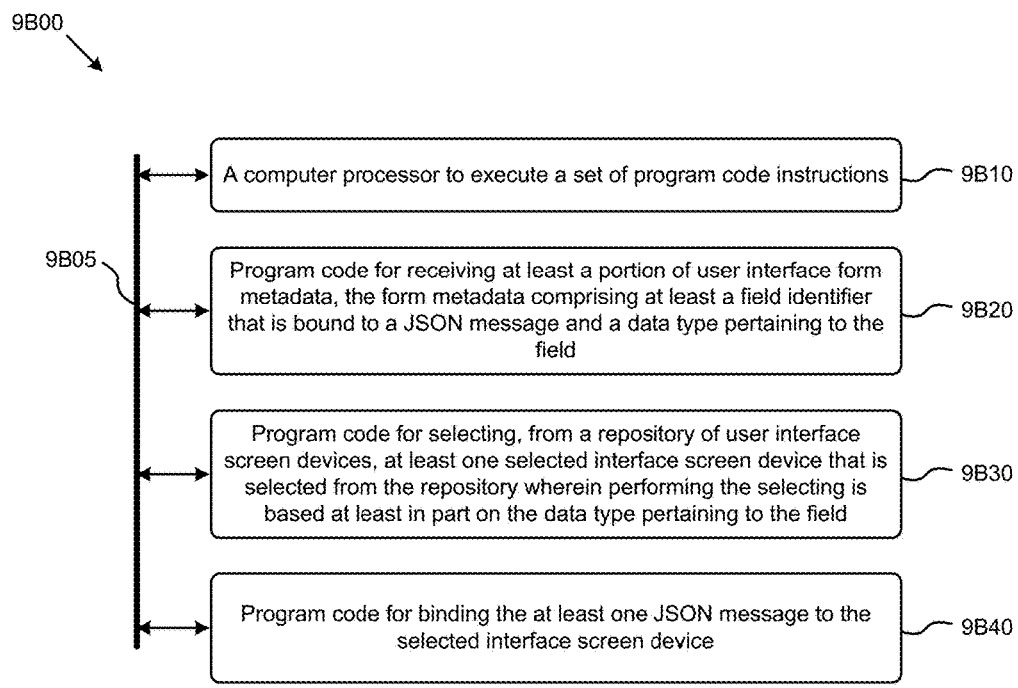

FIG. 9B is a block diagram of a system for implementing all or portions of any of the embodiments described herein. As shown, the system is comprised of a processor (see module 9B10) and other operational modules interconnected over communication path 9B05. At least some of the modules comprise program code for: receiving at least a portion of user interface form metadata, the form metadata comprising at least a field identifier that is bound to a JSON message and a data type pertaining to the field (see module 9B20); selecting, from a repository of user interface screen devices, at least one selected interface screen device that is selected from the repository wherein performing the selecting is based at least in part on the data type pertaining to the field (see module 9B30); and binding the at least one JSON message to the selected interface screen device (see module 9B40).

System Architecture Overview

Additional System Architecture Examples

Figure 10A:
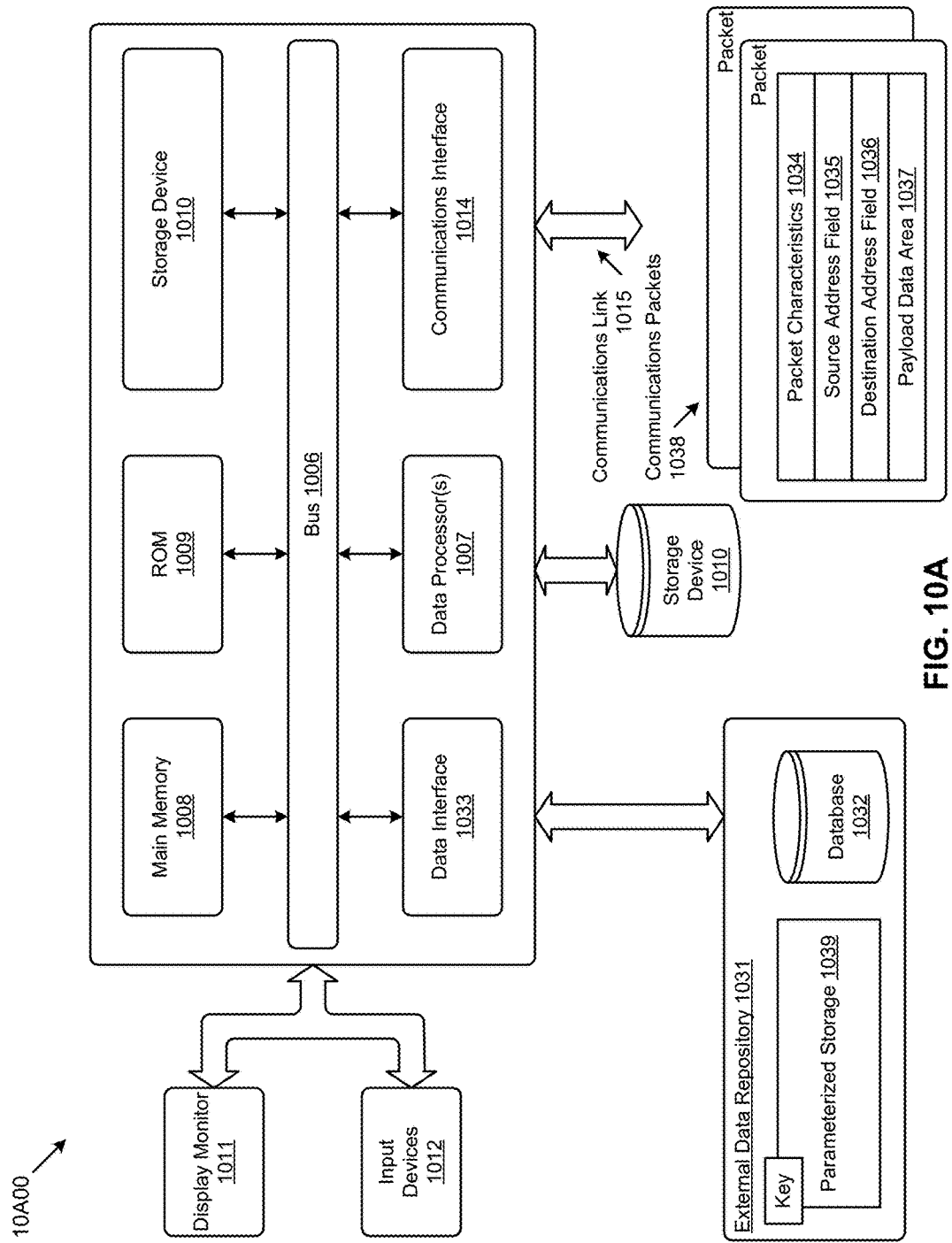
FIG. 10A, FIG. 10B, and FIG. 10C depict exemplary architectures of components suitable for implementing embodiments of the present disclosure, and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information, which interconnects subsystems and devices such as a processor 1007, a system memory (e.g., main memory 1008, or an area of random access memory RAM), a static storage device (e.g., ROM 1009), an internal or external storage device 1010 (e.g., magnetic or optical), a data interface 1033, a communication interface 1014 (e.g., PHY, MAC, Ethernet interface, modem, etc.), a display 1011 (e.g., CRT or LCD), input devices 1012 (e.g., keyboard, cursor control), and an external data repository 1031.

According to an embodiment of the disclosure, computer system 10A00 performs specific operations by processor 1007 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communication interface 1014. Instances of the communication interface 1014 may comprise one or more networking ports that are configurable (e.g., pertaining to speed, protocol, physical layer characteristics, media access characteristics, etc.) and any particular instance of the communication interface 1014 or port thereto can be configured differently from any other particular instance. Portions of a communication protocol can be carried out in whole or in part by any instance of the communication interface 1014, and data (e.g., packets, data structures, bit fields, etc.) can be positioned in storage locations within communication interface 1014, or within system memory, and such data can be accessed (e.g., using random access addressing, or using direct memory access DMA, etc.) by devices such as processor 1007.

The communications link 1015 can be configured to transmit (e.g., send, receive, signal, etc.) communications packets 1038 comprising any organization of data items. The data items can comprise a payload data area 1037, a destination address 1036 (e.g., a destination IP address), a source address 1035 (e.g., a source IP address), and can include various encodings or formatting of bit fields to populate the shown packet characteristics 1034. In some cases the packet characteristics include a version identifier, a packet or payload length, a traffic class, a flow label, etc. In some cases the payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 1031, which in turn can be formatted into any one or more storage areas, and which can comprise parameterized storage 1039 accessible by a key (e.g., filename, table name, block address, offset address, etc.).

In an embodiment of the disclosure, execution of the sequences of instructions to practice the disclosure is performed by a single instance of the computer system 10A00. According to certain embodiments of the disclosure, two or more instances of computer system 10A00 coupled by a communications link 1015 (e.g., LAN, PTSN, or wireless network) may perform the sequence of instructions required to practice embodiments of the disclosure using two or more instances of components of computer system 10A00.

The computer system 10A00 may transmit and receive messages, data, and instructions including programs (e.g., application code), through communications link 1015 and communication interface 1014. Received program code may be executed by processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key). A module as used herein can be implemented using any mix of any portions of the system memory and any extent of hard-wired circuitry including hard-wired circuitry embodied as a processor 1007. Some embodiments include one or more special-purpose hardware components (e.g., power control, logic, sensors, transducers, etc.). A module may include one or more state machines and/or combinational logic used to implement recasting form-based user interfaces into mobile device user interfaces using common data.

Various implementations of the database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement aspects of recasting form-based user interfaces into mobile device user interfaces. Such files or records can be brought into and/or stored in volatile or non-volatile memory.

Figure 10B:
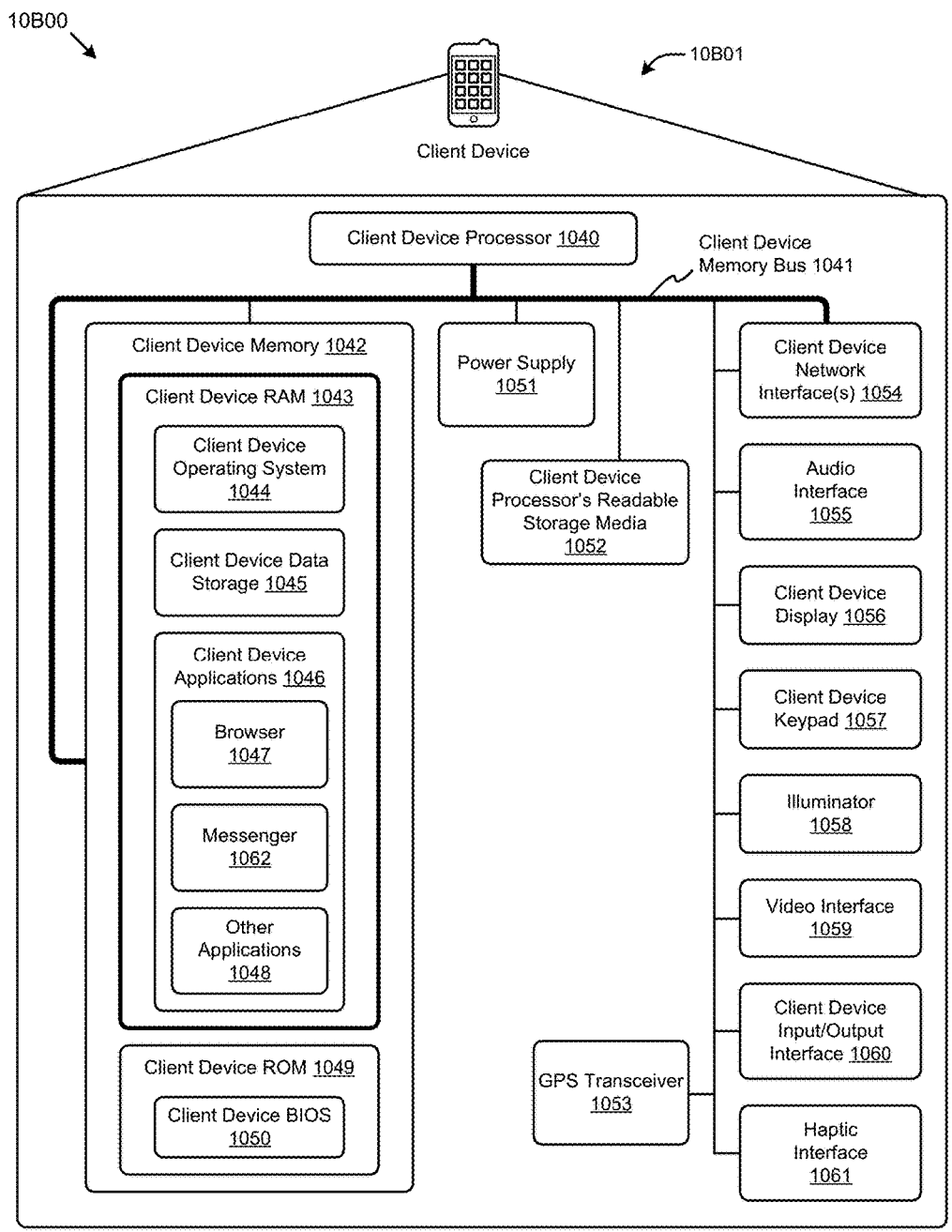

FIG. 10B depicts a block diagram 10B00 of an instance of a client device 10B01 that may be included in a system implementing instances of the herein-disclosed embodiments. Client device 10B01 may include many more or fewer components than those shown in FIG. 10B. Client device 10B01 may represent, for example, an embodiment of at least one of client devices as heretofore disclosed.

As shown in the figure, client device 10B01 includes a client device processor 1040 in communication with a client device memory 1042 via a client device memory bus 1041. Client device 10B01 also includes a power supply 1051, one or more client device network interfaces 1054, an audio interface 1055, a client device display 1056, a client device keypad 1057, an illuminator 1058, a video interface 1059, a client device IO interface 1060, a haptic interface 1061, and a GPS transceiver 1053 for global positioning services.

The power supply 1051 provides power to client device 10B01. A rechargeable or non-rechargeable battery may be used to provide power. The power may also be provided by an external power source such as an AC adapter or a powered docking cradle that supplements and/or recharges a battery.

A client device 10B01 may optionally communicate with a base station, or directly with another computing device. A client device network interface 1054 includes circuitry for coupling a client device 10B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 1054 is sometimes known as a transceiver, a transceiving device, or a network interface card (NIC).

An audio interface 1055 is arranged to produce and receive audio signals such as the sound of a human voice. For example, audio interface 1055 may be coupled to a speaker and microphone to enable telecommunication with others and/or generate an audio acknowledgement for some action.

A client device display 1056 may be a liquid crystal display (LCD), gas plasma, light emitting diode (LED), or any other type of display used with a computing device. A client device display 1056 may also include a touch sensitive screen arranged to receive input from an object such as a stylus or a digit from a human hand.

A client device keypad 1057 may comprise any input device arranged to receive input from a user. For example, client device keypad 1057 may include a push button numeric dial, or a keyboard. A client device keypad 1057 may also include command buttons that are associated with selecting and sending images.

An illuminator 1058 may provide a status indication and/or provide light. Illuminator 1058 may remain active for specific periods of time or in response to events. For example, when the illuminator 1058 is active, it may backlight the buttons on client device keypad 1057 and stay on while the client device is powered. Also, the illuminator 1058 may backlight these buttons in various patterns when particular actions are performed such as dialing another client device. An illuminator 1058 may also cause light sources positioned within a transparent or translucent case of the client device to illuminate in response to actions.

A video interface 1059 is arranged to capture video images such as a still photo, a video segment, an infrared video or the like. For example, the video interface 1059 may be coupled to a digital video camera, a web-camera or the like. A video interface 1059 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 10B01 comprise a client device IO interface 1060 for communicating with external devices such as a headset, or other input or output devices not shown in FIG. 10B. The client device IO interface 1060 can use one or more communication technologies such as a USB, infrared, Bluetooth™ port or the like. A haptic interface 1061 is arranged to as a human interface device (HID) to facilitate interaction with a user of a client device. Such interaction can include tactile feedback to a user of the client device. For example, the haptic interface 1061 may be employed to cause vibration of the client device 10B01 in a particular way (e.g., with a pattern or periodicity) and/or when interacting with one or another user.

A GPS transceiver 1053 can determine the physical coordinates of client device 10B01 on the surface of the Earth. The GPS transceiver 1053, in some embodiments, may be optional. The shown GPS transceiver 1053 outputs a location such as a latitude value and a longitude value. However, the GPS transceiver 1053 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 10B01 on the surface of the Earth. It is understood that under different conditions, a GPS transceiver 1053 can determine a physical location within millimeters for client device 10B01; and in other cases, the determined physical location may be less precise such as within a meter or significantly greater distances. In certain embodiments, the client device 10B01 may provide other information that may be employed to determine a physical location of the device including, for example, a media access control (MAC) address, IP address, IP port identifier, or the like.

The client device memory 1042 includes random access memory 1043, read-only memory 1049, and other storage means. The client device memory 1042 illustrates an example of computer readable storage media (devices) for storage of information such as computer readable instructions, data structures, program modules or other data. The client device memory 1042 stores a basic IO system (BIOS) in the embodiment of client device BIOS 1050 for controlling low-level operation of client device 10B01. The memory also stores an operating system 1044 for controlling the operation of client device 10B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include, or interface with a Java virtual machine module that enables control of hardware components and/or operating system operations via Java application programs.

The client device memory 1042 further includes one or more instances of client device data storage 1045, which can be used by client device 10B01 to store, among other things, client device applications 1046 and/or other data. For example, client device data storage 1045 may also be employed to store information that describes various capabilities of client device 10B01. The information may then be provided to another device based on any of a variety of events including being sent as part of a header during a communication, sent upon request or the like. Client device data storage 1045 may also be employed to store social networking information including address books, buddy lists, aliases, user profile information or the like. Further, client device data storage 1045 may also store messages, web page content, or any of a variety of content (e.g., received content, user generated content, etc.).

At least a portion of the information may also be stored on any component or network device including, but not limited, to a client device processor's readable storage media 1052, a disk drive or other computer readable storage devices within client device 10B01, etc.

An instance of a client device processor's readable storage media 1052 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 1052 may also be referred to herein as computer readable storage media.

The client device applications 1046 may include computer executable instructions which, when executed by client device 10B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 1046 may include, for example, a messenger 1062, a browser 1047, and other applications 1048. Certain other applications 1048 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 1048 may collect and store user data that may be received from other computing devices in the environment.

A messenger 1062 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 1062 may be configured as an IM application such as AOL (America Online) instant messenger, Yahoo! messenger, .NET messenger server, ICQ or the like. In certain embodiments, the messenger 1062 may be configured to include a mail user agent (MUA) such as Elm, Pine, message handling (MH), Outlook, Eudora, Mac Mail, Mozilla Thunderbird or the like. In another embodiment, the messenger 1062 may be a client device application that is configured to integrate and employ a variety of messaging protocols including, but not limited, to various push and/or pull mechanisms for client device 10B01. In certain embodiments, the messenger 1062 may interact with the browser 1047 for managing messages. As used herein, the term "message" refers to any of a variety of messaging formats, or communications form including, but not limited to, email, SMS, IM, MMS, IRC or the like.

A browser 1047 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 1047 may enable a user of client device 10B01 to communicate with another network device as may be present in the environment.

Figure 10C:
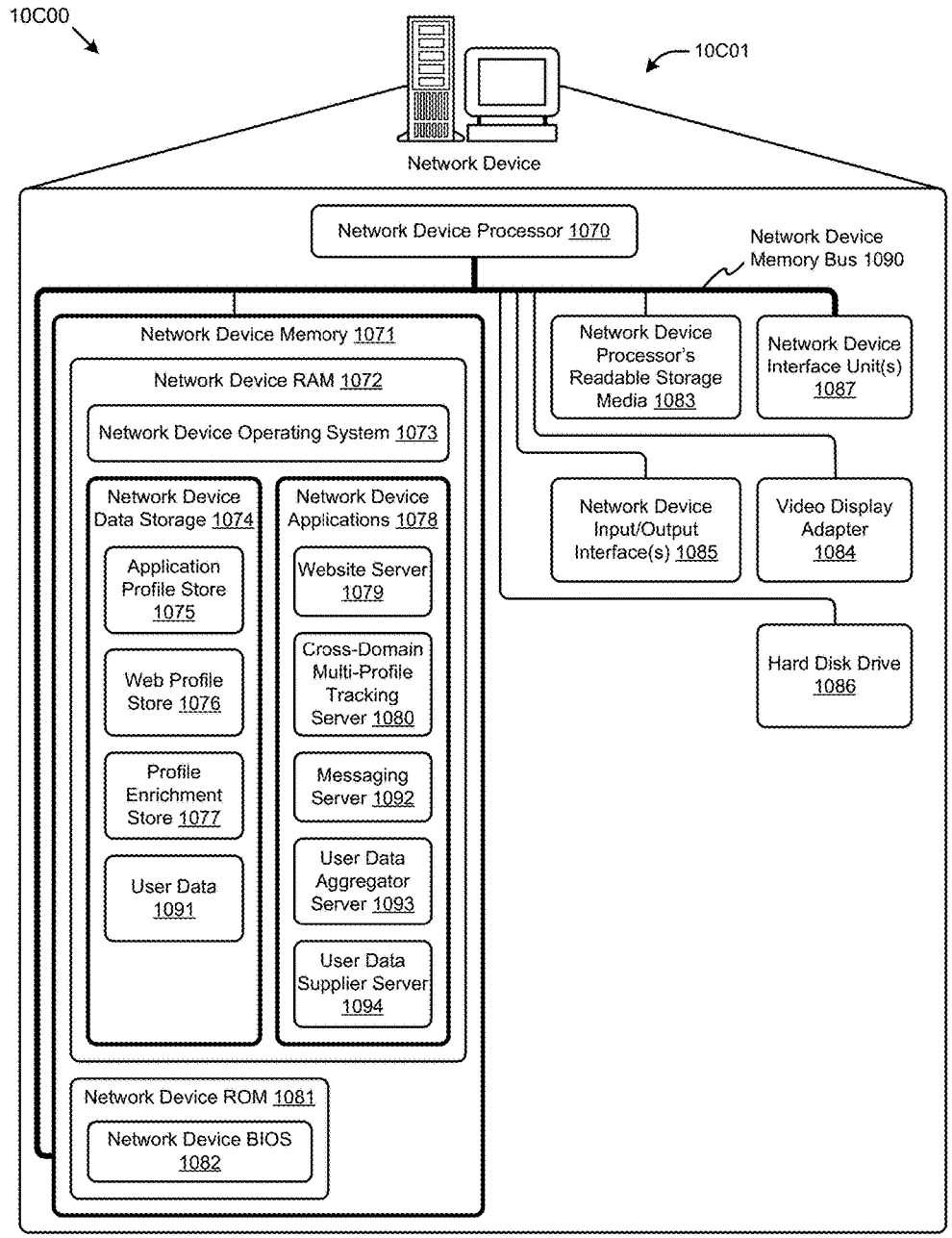

FIG. 10C depicts a block diagram 10C00 of an instance of a network device 10C01 that may be included in a system implementing instances of the herein-disclosed embodiments. Network device 10C01 may include many more or fewer components than those shown. Network device 10C01 may be configured to operate as a server, client, peer, a host, or any other device.

The network device 10C01 includes at least one instance of a network device processor 1070, instances of readable storage media 1083, network interface(s) 1087, a network device IO interface 1085, a hard disk drive 1086, a video display adapter 1084, and a network device memory 1071, all in communication with each other via a network device memory bus 1090. The network device memory generally includes network device RAM 1072, network device ROM 1081. Some embodiments include one or more non-volatile mass storage devices such as a hard disk drive 1086, a tape drive, an optical drive, and/or a floppy disk drive. The network device memory stores a network device operating system 1073 for controlling the operation of network device 10C01. Any general-purpose operating system may be employed. A basic input/output system (BIOS) is also provided in the form of network device BIOS 1082 for controlling the low-level operation of network device 10C01. As illustrated in FIG. 10C, a network device 10C01 also can communicate with the Internet, or some other communications network, via a network interface unit 1087, which is constructed for use with various communication protocols including the TCP/IP protocol. The network interface unit 1087 is sometimes known as a transceiver, a transceiving device, or a network interface card (NIC). Network device 10C01 also comprises a network device IO interface 1085 for communicating with external devices such as a keyboard or other input or output devices. A network device IO interface 1085 can use one or more communication technologies such as USB, infrared, Bluetooth™ or the like.

The storage devices as described above may use various types of computer readable media, namely non-volatile computer readable storage media and/or a client device processor's readable storage media 1083 and/or a network device processor's readable storage media 1083. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 1074 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 1074 may further include program code, data, algorithms and the like, for use by a processor such as a network device processor 1070 to execute and perform actions. In certain embodiments, at least some of the logical contents of network device data storage 1074 might be stored on another component of network device 10C01, such as on a second instance of hard disk drive 1086 or on an external/removable storage device.

The network device data storage 1074 may further store any portions of application data and/or user data such as an application profile store 1075, a web profile store 1076, a profile enrichment store 1077 and/or any user data collected. In some embodiments, user data 1091 may store unique user data, non-unique user data, aggregated user data, and/or any combination thereof. User data 1091 may include a variety of attributes such as a five digit zip code, an expanded nine digit zip code and the like.

The Network device data storage 1074 may also store program code and data. One or more network device applications 1078 may be loaded into network device data storage or any other mass memory, to be accessible to run with or as a part of network device operating system 1073. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 1092, website server 1079, user data aggregator server 1093, a cross-domain multi-profile tracking server 1080, and/or user data supplier server 1094 may also be included within or implemented as application programs.

A messaging server 1092 may include virtually any computing component or components configured and arranged to forward messages from message user agents and/or other message servers, or to deliver messages to a local message store such as network device data storage 1074 or the like. Thus, a messaging server 1092 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 1092 may also be managed by one or more components of the messaging server 1092. Thus, the messaging server 1092 may also be configured to manage SMS messages; IM, MMS, IRC, or RSS feeds; mIRC; or any of a variety of other message types. In certain embodiments, the messaging server 1092 may enable users to initiate and/or otherwise conduct chat sessions, VOIP sessions or the like.

A website server 1079 may represent any of a variety of information and services that are configured to provide content, including messages, over a network to another computing device. Thus, a website server 1079 can include, for example, a web server, a file transfer protocol (FTP) server, a database server, a content server or the like. A website server 1079 may provide the content including messages over the network using any of a variety of formats including, but not limited to WAP, HDML, WML, SGML, HTML, XML, compact HTML (cHTML), extensible HTML (xHTML) or the like. A website server 1079 may also be configured to enable a user of a client device to browse websites, upload user data, view and interact with advertisements or the like.

A user data aggregator server 1093 is configured to aggregate user data to be provided to user data buyers for advertising campaigns. In certain embodiments, a user data aggregator server 1093 may be configured to receive collected user data from a user data supplier server 1094. In some embodiments, a user data aggregator server 1093 may receive a query for user data. Based on the query, a user data aggregator server 1093 may generate a plurality of subsets of aggregated user data. In some embodiments, user data aggregator server 1093 may be included in a network device.

A user data supplier server 1094 is configured to collect user data. In certain embodiments, the user data supplier server 1094 may be configured to provide the collected user data to user data aggregator server 1093. In some embodiments, the user data supplier server 1094 may collect and/or provide unique user data and/or non-unique user data. In certain embodiments, the user data supplier server 1094 may aggregate the collected user data. In some embodiments, the user data supplier server 1094 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network including any sub-networks and/or wireless networks are in communication with, and enables communication between each of the components the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device or network.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, a network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method comprising:
receiving at least a portion of form metadata of a respective user interface, the form metadata comprising at least a field that is bound to a JSON message and a data type pertaining to the field;
selecting, from a repository of user interface screen devices, at least one selected interface screen device based at least in part on the data type pertaining to the field;
binding the JSON message to the at least one selected interface screen device; and
selecting at least one second selected interface screen device from the user interface screen devices based at least in part on a second data type of a second field described in the form metadata.

2. The method of claim 1, wherein the at least one selected interface screen device is selected based at least in part on a set of user device parameters.

3. The method of claim 1, wherein the at least one selected interface screen device is selected based at least in part on a set of system preferences.

4. The method of claim 1, further comprising selecting the second selected screen device based at least in part on a probabilistic model of field usage.

5. The method of claim 1, wherein the second selected interface screen device comprises at least one of, an auto-fill field, or a wizard prompt, or a search box, or any combination thereof.

6. The method of claim 5, wherein the search box is pre-populated with a search term.

7. The method of claim 1, wherein the repository of user interface screen devices comprises Polymer elements.

8. The method of claim 1, wherein the form metadata further comprises at least one of, a description of a field, or an operation pertaining to the field, or a combination thereof.

9. The method of claim 1, wherein the data type pertaining to the field is a field describing a date or field describing an activity.

10. A computer program product, embodied in a non-transitory computer readable medium, the non-transitory computer readable medium having stored thereon a sequence of instructions which, when stored in memory and executed by a processor causes the processor to execute a process, the process comprising:

receiving at least a portion of form metadata of a respective user interface, the form metadata comprising at least a field that is bound to a JSON message and a data type pertaining to the field;

selecting, from a repository of user interface screen devices, at least one selected interface screen device based at least in part on the data type pertaining to the field;

binding the JSON message to the at least one selected interface screen device; and selecting at least one second selected interface screen device from the user interface screen devices based at least in part on a second data type of a second field described in the form metadata.

11. The computer program product of claim 10, wherein the at least one selected interface screen device is selected based at least in part on a set of user device parameters.

12. The computer program product of claim 10, wherein the at least one selected interface screen device is selected based at least in part on a set of system preferences.

13. The computer program product of claim 10, wherein the repository of user interface screen devices comprises Polymer elements.

14. The computer program product of claim 10, further comprising instructions to cause the process to select the second selected screen device based at least in part on a probabilistic model of field usage.

15. The computer program product of claim 10, wherein the second selected interface screen device comprises at least one of, an auto-fill field, or a wizard prompt, or a search box, or any combination thereof.

16. The computer program product of claim 10, wherein the form metadata further comprises at least one of, a description of a field, or an operation pertaining to the field, or a combination thereof.

17. The computer program product of claim 15, wherein the search box is pre-populated with a search term.

18. The computer program product of claim 10, wherein the data type pertaining to the field is a field describing a date or field describing an activity.

19. A system comprising:

a memory for storing a sequence of instructions; and a processor which performs a set of actions when executing the sequence of instructions, the set of actions comprising:

receiving at least a portion of form metadata of a respective user interface, the form metadata comprising at least a field that is bound to a JSON message and a data type pertaining to the field;

selecting, from a repository of user interface screen devices, at least one selected interface screen device based at least in part on the data type pertaining to the field;

binding the JSON message to the at least one selected interface screen device; and selecting at least one second selected interface screen device from the user interface screen devices based at least in part on a second data type of a second field described in the form metadata.

20. The system of claim 19, wherein the at least one selected interface screen device is selected based at least in part on a set of user device parameters.

21. The system of claim 19, wherein the at least one selected interface screen device is selected based at least in part on a set of system preferences.

22. The system of claim 19, wherein the set of actions further comprise selecting the second selected screen device based at least in part on a probabilistic model of field usage.

23. The system of claim 19, wherein the second selected interface screen device comprises at least one of, an auto-fill field, or a wizard prompt, or a search box, or any combination thereof.

24. The system of claim 23, wherein the search box is pre-populated with a search term.

25. The system of claim 19, wherein the repository of user interface screen devices comprises Polymer elements.

26. The system of claim 19, wherein the form metadata further comprises at least one of, a description of a field, or an operation pertaining to the field, or a combination thereof.

27. The system of claim 19, wherein the data type pertaining to the field is a field describing a date or field describing an activity.

\* \* \* \* \*

UNITED STATES PATENT AND TRADEMARK OFFICE
CERTIFICATE OF CORRECTION

PATENT NO. : 10,088,979 B2
APPLICATION NO. : 14/831633
DATED : October 2, 2018
INVENTOR(S) : Rodgers et al.

Page 1 of 1

It is certified that error appears in the above-identified patent and that said Letters Patent is hereby corrected as shown below:

In the Specification

In Column 2, Line 60, Below "BRIEF DESCRIPTION OF THE DRAWINGS" insert -- The drawings described below are for illustration purposes only. The drawings are not intended to limit the scope of the present disclosure. This patent or application file contains at least one drawing executed in color. Copies of this patent or patent application publication with color drawing(s) will be provided by the Office upon request and payment of fees. --. (As a new paragraph)

In Column 7, Lines 10-11, delete "platform102$_4$" and insert -- platform 102$_4$ --, therefor.

In Column 18, Line 14, delete "9B 10)" and insert -- 9B10) --, therefor.

Signed and Sealed this
Fourteenth Day of January, 2020

Andrei Iancu
*Director of the United States Patent and Trademark Office*